(12) United States Patent
Hanabusa et al.

(10) Patent No.: US 8,036,157 B2
(45) Date of Patent: Oct. 11, 2011

(54) WIRELESS COMMUNICATION SYSTEM

(75) Inventors: Toshio Hanabusa, Kawasaki (JP);
Naoto Toda, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 971 days.

(21) Appl. No.: 11/820,455

(22) Filed: Jun. 19, 2007

(65) Prior Publication Data
US 2008/0002614 A1   Jan. 3, 2008

(30) Foreign Application Priority Data

Jun. 28, 2006  (JP) ................................. 2006-178385

(51) Int. Cl.
*H04W 4/00* (2009.01)
(52) U.S. Cl. ........ 370/328; 370/331; 455/436; 455/439; 455/442; 455/432.1
(58) Field of Classification Search .................. 370/328, 370/331; 455/436, 439, 442, 432.1
See application file for complete search history.

(56) References Cited

U.S. PATENT DOCUMENTS

| | | | |
|---|---|---|---|
| 2002/0118664 A1 | 8/2002 | Ishibashi et al. | |
| 2004/0121771 A1* | 6/2004 | Song et al. | 455/436 |
| 2004/0203783 A1* | 10/2004 | Wu et al. | 455/436 |
| 2005/0266848 A1 | 12/2005 | Kim | |
| 2006/0251021 A1* | 11/2006 | Nakano et al. | 370/331 |
| 2010/0029281 A1* | 2/2010 | Watanabe | 455/436 |

FOREIGN PATENT DOCUMENTS

| | | |
|---|---|---|
| JP | 2001-103574 A | 4/2001 |
| JP | 2002-252620 A1 | 9/2002 |
| JP | 2005-006216 A | 1/2005 |
| JP | 2005-012620 A | 1/2005 |
| KR | 2006-0045918 A | 5/2006 |
| WO | WO 2005/039072 A1 | 4/2005 |

OTHER PUBLICATIONS

Japanese Office Action (and English translation thereof) dated Oct. 21, 2008, issued in a counterpart Japanese Application.
Japanese Office Action dated May 13, 2008, issued in counterpart application JP 2006-178385.
Korean Office Action (and English translation thereof) dated Jul. 29, 2008, issued in a counterpart Korean Application.

* cited by examiner

*Primary Examiner* — Nimesh Patel
(74) *Attorney, Agent, or Firm* — Holtz, Holtz, Goodman & Chick, PC

(57) ABSTRACT

A wireless communication system. The system includes a wireless communication terminal, a base station to which the wireless communication terminal wirelessly connects at a time of starting communication with the specific communication party, another base station to which the wireless communication terminal newly connects after starting communication with the specific communication party and a transfer unit which transfers information transmitted from the specific communication party to the another base station.

6 Claims, 20 Drawing Sheets

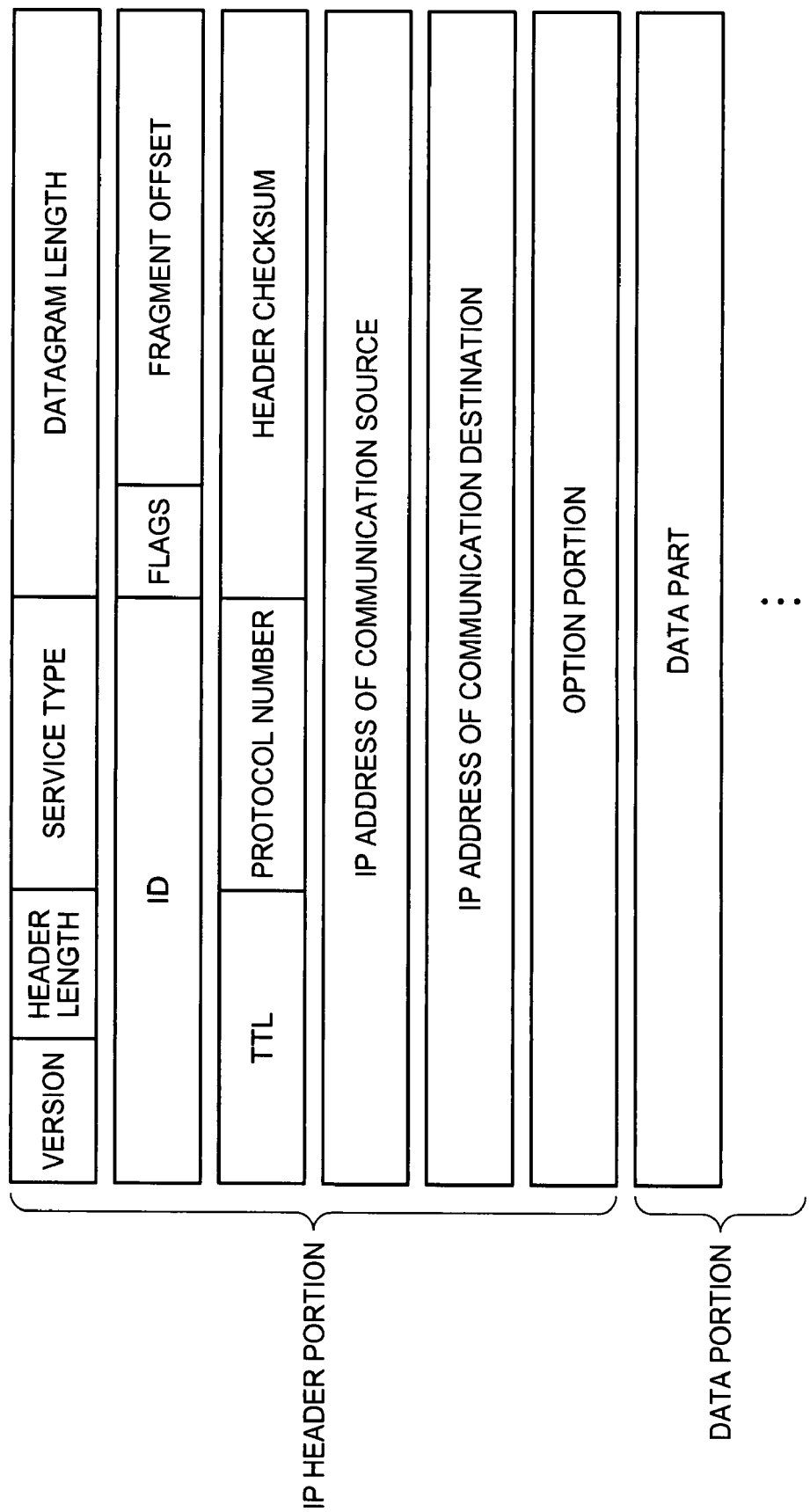

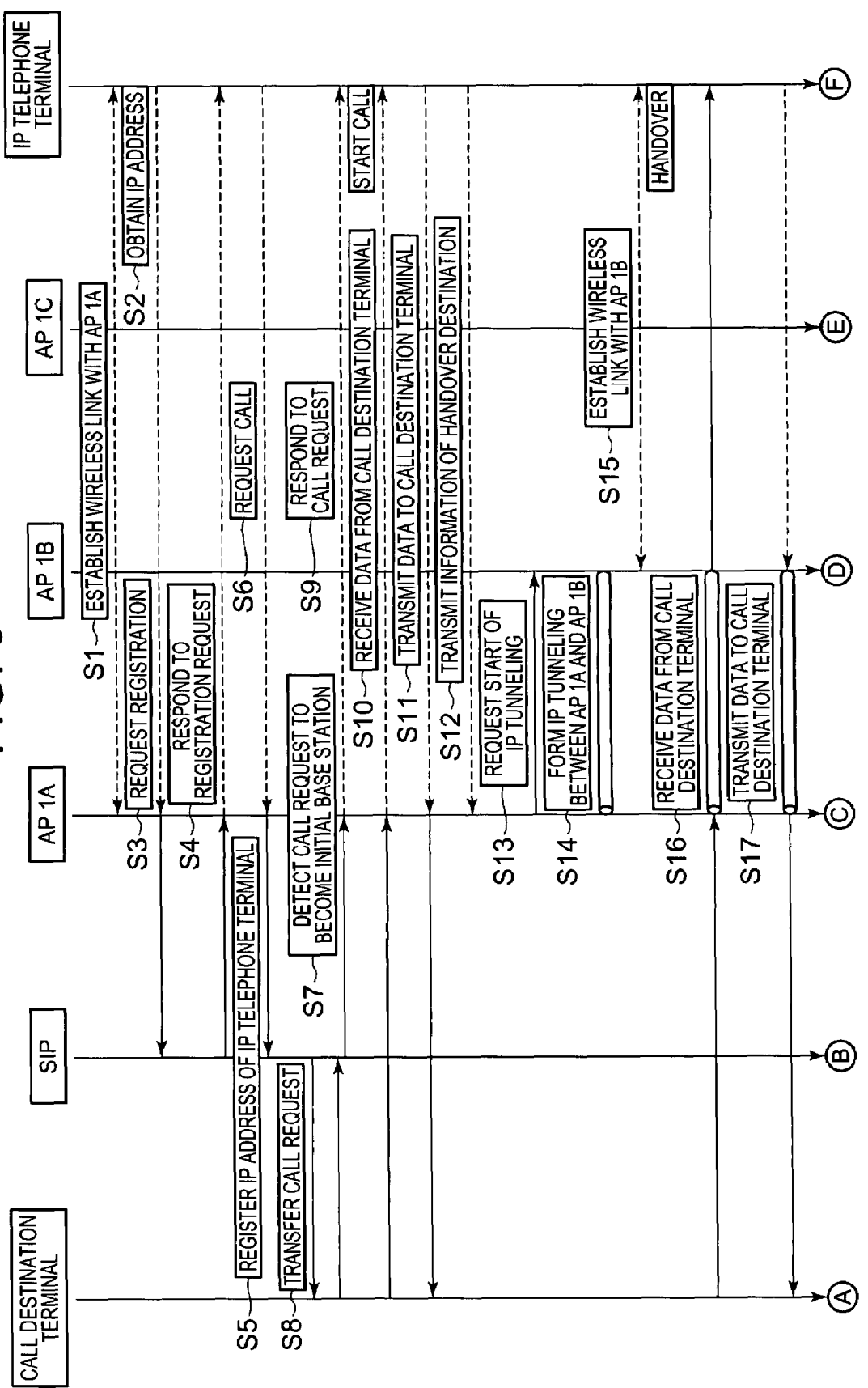

WIRELESS COMMUNICATION SYSTEM

BACKGROUND OF THE INVENTION

1. Field of the Invention

The present invention relates to a wireless communication system that changes an access point (base station) to which a wireless communication terminal such as an internet protocol (IP) telephone terminal is connected when the wireless communication terminal moves between different networks while communicating with a communication party.

2. Related Art

In recent years, a wireless communication system has changed to enable an IP telephone terminal connected with an access point among a plurality of access points through a wireless local area network (LAN) or the like to continue to communicate with a communication destination terminal by enabling the IP telephone to perform the handover of the access point to the one having a higher signal transmission power level when the IP telephone moves between different subnetworks, owing to the development of an IP network communication technology and a mobile communication technology (see, for example, JP-2005-6216A).

Now, the handover processing will be described with reference to FIG. 21.

FIG. 21 shows an IP telephone system 500 in which an IP telephone terminal 502 and a call destination terminal 503 are connected with each other through a predetermined network circuit N to perform packet communication (calls). For example, when a user carrying the IP telephone terminal 502 moves from a position A to a position C passing through a position B, then the received power levels of the signals from a first access point 501A become gradually lower.

In this case, when the IP telephone terminal 502 detects the lowering of the received power levels, the IP telephone terminal 502 performs processing of changing access points 501.

Concretely, first, the IP telephone terminal 502 transmits a probe request and detects the received power levels of the probe responses transmitted from the neighbor access points 501 to the probe request. Then, the IP telephone terminal 502 sets the access point which sent the probe responses with the highest level (for example, which is the access point 501B in FIG. 21) as the new access point 501 of the handover destination. When the new access point 501 of the handover destination is determined, the IP telephone terminal 502 establishes a wireless link with the access point 501B.

Next, the IP telephone terminal 502 accesses a dynamic host configuration protocol (DHCP) server (not shown) to obtain a new IP address. For example, the IP address thereby comes to be changed from "192.168.1.10" to "192.168.2.10." The IP telephone terminal 502 successively transmits a request to notify the call destination terminal 503 of the change of the own IP address of the IP telephone terminal 502, to a session initiation protocol (SIP) server 506.

When the SIP server 506 receives the request from the IP telephone terminal 502, the SIP server 506 transmits the request to the call destination terminal 503.

When the call destination terminal 503 receives the request from the SIP server 506, the call destination terminal 503 performs the processing of dealing with the change of the IP address of the IP telephone terminal 502. Now the handover processing is set to be performed when an IP telephone terminal detects the lowering of the received power levels and judges to change the access point. In this case, a call between IP telephony terminal and the call destination terminal is interrupted until a SIP server completes registration of new IP address, which is obtained by the IP telephony terminal after access point change. If such an interruption continues several seconds, the commercial value of the IP telephone will decrease.

Meanwhile, as a technology for continuing communication with a communication destination terminal even when a terminal moves between different subnetworks while holding the IP address thereof, for example, the "mobile IP" technology and the like, which are defined by Request for Comment (RFC) 2002 and RFC 3220 of Internet Engineering Task Force (IETF), are also known.

However, because the mobile IP system is is not cost effective due to its large scale. Furthermore, the system is configured to perform the transmission and the reception of information through a fixed "home agent". Due to this, increase of the distance from an IP telephone terminal to the "home agent" leads to increase of intermediate networks. The increase of intermediate networks cause wasteful data traffic and decreases efficiency of whole network.

SUMMARY OF THE INVENTION

An object of the present invention is to realize a wireless communication system capable of shortening the ceasing time of information communication at the time of changing a base station more inexpensively.

In accordance with an aspect of the invention, a wireless communication system includes a wireless communication terminal to have a communication with a specific communication party, a first base station to which the wireless communication terminal wirelessly connects at a time of starting communication with the specific communication party, a second base station to which the wireless communication terminal newly connects after starting communication with the specific communication party and a transfer unit, which is included in the first base station, to transfer information transmitted from the specific communication party to the second base station.

BRIEF DESCRIPTION OF THE DRAWINGS

FIG. 4 is a diagram schematically showing the packet structure of the data which is transmitted and received in the IP telephone system of FIG. 1;

FIG. 6 is a diagram showing an example of the operation of handover processing of the IP telephone system of FIG. 1;

DETAILED DESCRIPTION OF THE PREFERRED EMBODIMENTS

In the following, concrete embodiments of the present invention will be described with reference to the accompanying drawings. However, the scope of the invention is not limited to the shown examples.

First Embodiment

Figure 1:
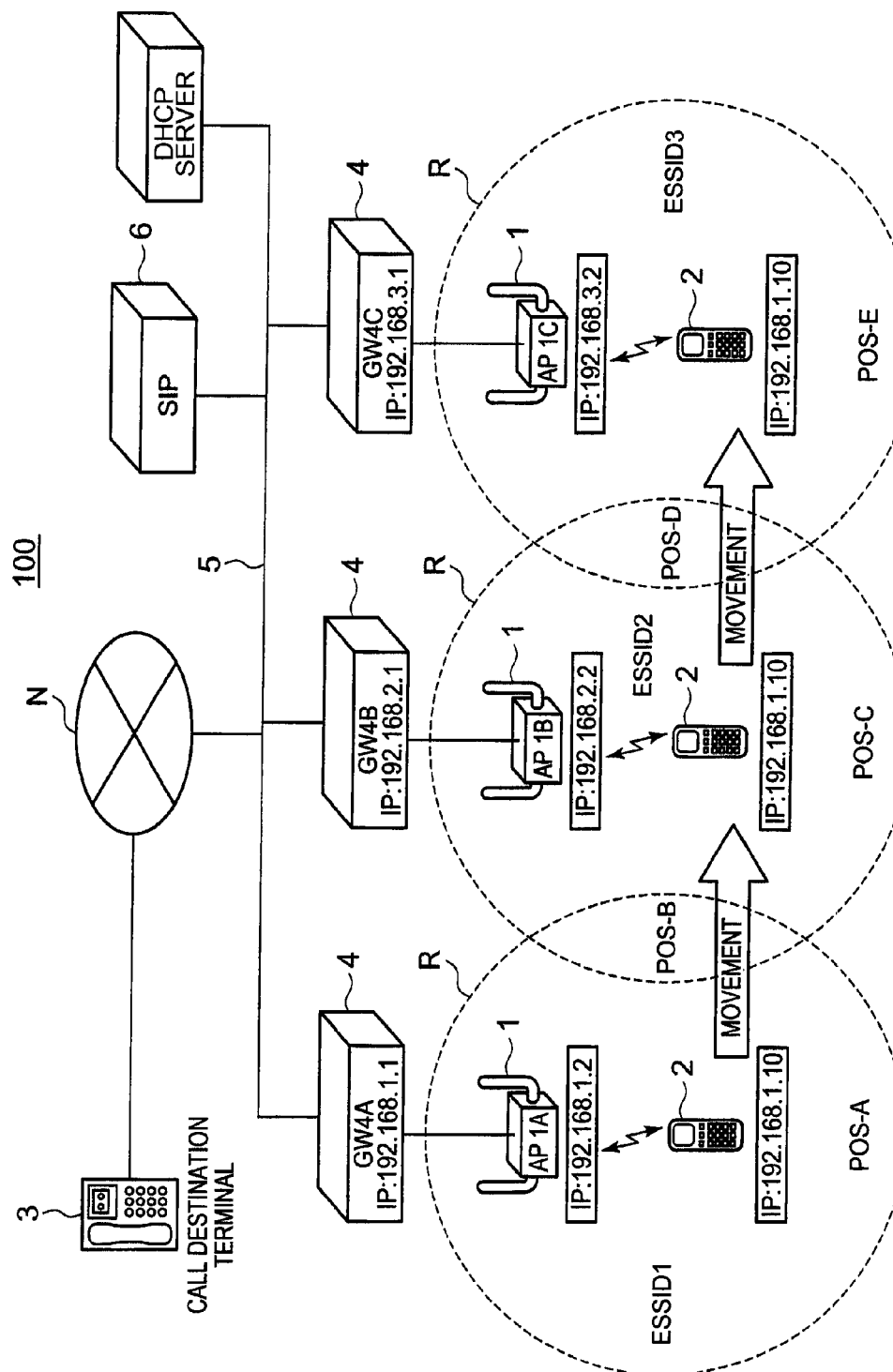
FIG. 1 is a view schematically showing the configuration of an IP telephone system exemplified as a suitable example of the wireless communication system of a first embodiment to which the present invention is applied.

FIG. 1 is a view schematically showing the configuration of an IP telephone system 100 exemplified as a suitable example of the wireless communication system of a first embodiment, to which the present invention is applied.

The IP telephone system (wireless communication system) 100 according to the first embodiment performs a call (communication) without stopping it while the IP telephone terminal 2 is carried by a user or the like to move between different subnetworks from a position A (POS-A) to a position E (POS-E) with carrying on a communication with a call destination terminal 3. Such a continuous communication is performed by a handover processing for changing an access point 1 to be wirelessly connected to the IP telephone terminal 2.

To put it concretely, the IP telephone system 100 is composed of, as shown in FIG. 1, a plurality of access points (AP's) 1 (a first to a third access points 1A, 1B and 1C in FIG. 1), the IP telephone terminal 2 connected to any one of these access points 1 through a wireless LAN in accordance with IEEE 802.11 initial or the like for performing packet communication (the details of which will be described later), the call destination terminal 3 connected to the access points 1 through a predetermined network circuit N such as an in-house LAN, a session initiation protocol (SIP) server 6 performing the registration and the change of an IP address of the IP telephone terminal 2, the call connection processing of the IP telephone, and the like.

Figure 2:
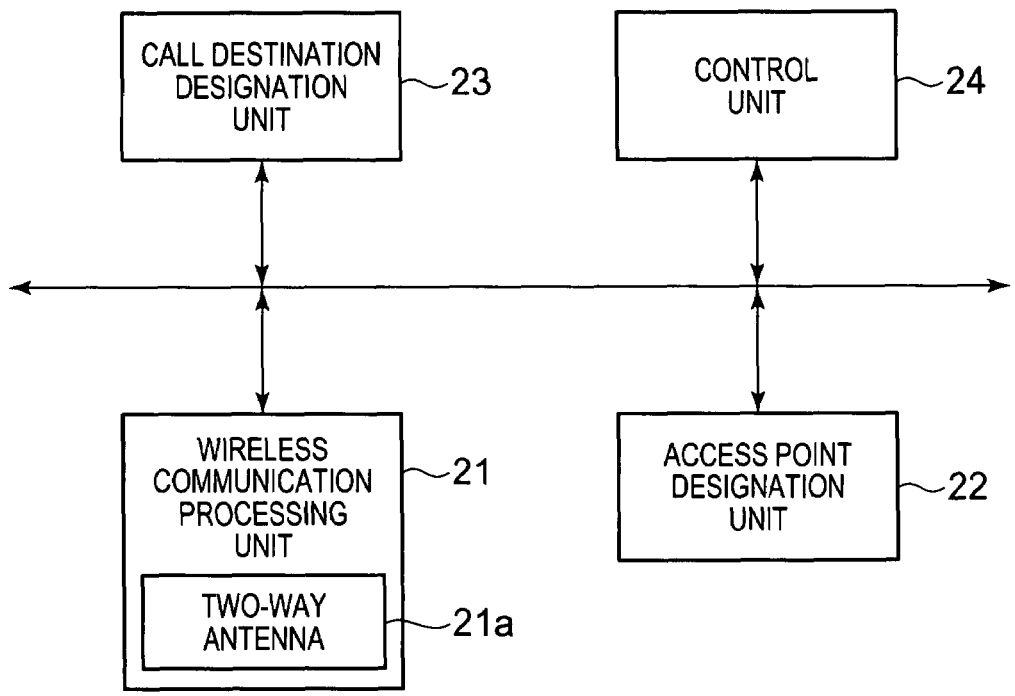
FIG. 2 is a block diagram of an IP telephone terminal constituting the IP telephone system of FIG. 1.

First, the IP telephone terminal 2 is described in detail with reference to FIG. 2. FIG. 2 is a block diagram of the IP telephone terminal 2.

As shown in FIG. 2, the IP telephone terminal 2 is provided with a wireless communication processing unit 21, an access point designation unit 22, a call destination designation unit 23, a control unit 24, and the like.

The wireless communication processing unit 21 performs wireless communication with the access points 1 using a predetermined IP address (for example, "IP: 192.168.1.10" or the like). The wireless communication processing unit 21 is provided with a two-way antenna 21a for transmission and reception.

The antenna 21a performs transmission and reception of signals with the access points 1. Concretely, the antenna 21a transmits and receives the signals with a predetermined frequency channel by using predetermined identifiers "ESSID's" corresponding to the subnetworks of the access points 1 from the two-way antenna 21a.

Concretely, the wireless communication processing unit 21 transmits probe requests from the two-way antenna 21a for all of the identifiers "ESSID's" for identifying the subnetworks and the frequency channel in the case of retrieving the access points 1 capable of establishing a wireless link in the neighbor of the IP telephone terminal 2 at predetermined timing. That is, the wireless communication processing unit 21, for example, transmits the probe requests using identifiers "ESSID 1," "ESSID 2," "ESSID 3" and the like from the two-way antenna 21a.

The wireless communication processing unit 21 transmits an association request from the two-way antenna 21a when the wireless communication processing unit 21 establishes a wireless link with one of the access points 1 designated as a connection destination by the access point designation unit 22. Then, the wireless link is established between the access point 1 and the IP telephone terminal 2 based on an association response from the access point 1.

Furthermore, the wireless communication processing unit 21 obtains the IP address in the subnetwork to which the access point 1 is connected, from a DHCP server (FIG. 1) through the access point 1 after the establishment of the wireless link. Thus, the wireless communication processing unit 21 performs wireless communication by using the obtained IP address.

When an access point 1, for example, the second or the third access point 1B or 1C (which will be described later) or the like, of a handover destination is designated by the access point designation unit 22, the wireless communication processing unit 21 transmits the information of the handover destination indicating that the access point 1 is the handover destination, to the access point 1 (for example, the first access point 1A (described later)) which is currently connected.

Furthermore, the wireless communication processing unit 21 obtains the same network address as that of the network to which the access point 1 of the handover destination is connected after the end of a call. The wireless communication processing unit 21 obtains the IP address in the subnetwork to which the access point 1 is connected from the DHCP server through the access point 1 after the end of a call.

Concretely, the wireless communication processing unit 21 judges the end of a call based on a user's operation of a call ending button (not shown) in the operation unit of the IP telephone terminal 2 or the reception of a disconnect request transmitted from the call destination terminal 3, and the wireless communication processing unit 21 then obtains the IP address in the subnetwork to which the access point 1 is connected.

The access point designation unit 22 designates the access point 1 of the connection destination or the handover destination (destination changed). When the access points 1 respond to the probe request transmitted from the wireless communication processing unit 21 (probe responses), the access point designation unit 22 detects the received power levels of the probe responses. Then, the access point designation unit 22 designates the access point 1 having the highest received power level as the access point 1 of the connection destination or the handover destination.

That is, when the access point designation unit 22 designates a handover destination, the access point designation unit 22 detects the received power level of the signal transmitted from the access point 1 and received by the two-way antenna 21a at predetermined timing, and judges whether or not the received power level is a predetermined value or less. When the access point designation unit 22 judges that the received power level is the predetermined value or less, the access point designation unit 22 detects the received power levels of the probe responses transmitted from the neighbor access points 1 to specify the access point 1 having the highest received power level as the access point 1 of the handover destination.

The call destination designation unit 23 designates a call destination terminal as a specific communication party (calling party) specified by the telephone number (not shown).

The control unit 24 is composed of a CPU, a RAM, a ROM and the like, though they are not shown, and wholly controls each unit.

In the following, the access points 1 are described with reference to FIGS. 3-5B.

Figure 3:
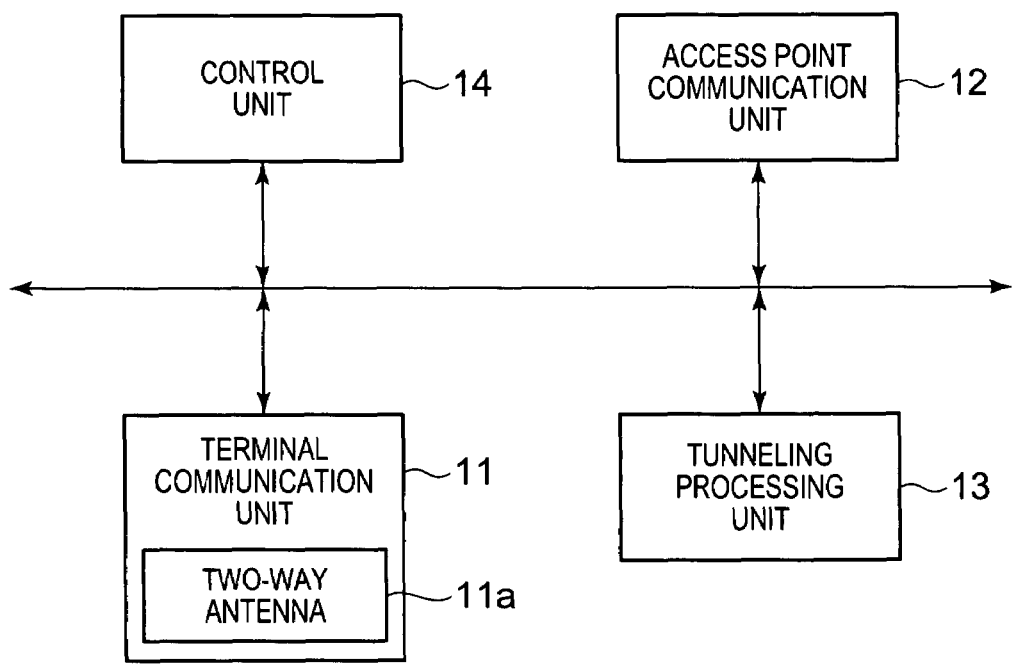
FIG. 3 is a block diagram of an access point constituting the IP telephone system of FIG. 1.

FIG. 3 is a block diagram of each of the access points 1.

In the following description, it is supposed that an access point with which the IP telephone terminal 2 establishes a wireless link at the time of the start of a call among the plurality of access points 1 is referred to as a "initial access point", and that an access point of a handover destination is referred to as a "handover destination access point".

As shown in FIG. 1, the plurality of access points (base stations) 1, . . . establish wireless links with the IP telephone terminal 2 at a predetermined frequency (CH) to perform communication. The plurality of access points 1, . . . are connected with one another in the state of being capable of freely communicating with one another through predetermined gateways 4 and a wired LAN 5. To put it concretely, the access points 1, . . . includes the first access point 1A, the second access point 1B, the third access point 1C, and the like.

The first access point 1A is connected to a subnetwork (identifier: "ESSID 1") having an IP address of a network address "192.168.1". The first access point 1A is further connected to a first gateway 4A having an IP address "192.168.1.1". The first access point 1A performs wireless communication in the subnetwork using the IP address "192.168.1.2".

The second access point 1B is connected to a subnetwork (identifier: "ESSID 2") having an IP address of a network address "192.168.2". The second access point 1B is further connected to a second gateway 4B having an IP address "192.168.2.1". The second access point 1B performs wireless communication in the subnetwork using an IP address "192.168.2.2".

The third access point 1C is connected to a subnetwork (identifier "ESSID 3") having an IP address of a network address "192.168.3". The third access point 1C is further connected to a third gateway 4C having an IP address "192.168.3.1". The third access point 1C performs wireless communication in the subnetwork using an IP address "192.168.3.2".

The plurality of access points 1, . . . are arranged at predetermined intervals so that the communication coverage R of at least adjoining access points 1 overlaps each other, where the communication coverage R indicates the range capable of communicating with the IP telephone terminal 2.

Each of the access points 1 is provided with, as shown in FIG. 3, a terminal communication unit 11, an access point communication unit 12 communicating with the other access points 1, a tunneling processing unit 13 performing the formation and the release of the IP tunneling with the other access points 1, a control unit 14 controlling each of these units, and the like.

The terminal communication unit 11 establishes a wireless link with the IP telephone terminal 2 to perform communication with the IP telephone terminal 2. The terminal communication unit 11 is provided with a two-way antenna 11a. The two-way antenna 11a performs transmission and reception of a signal with the IP telephone terminal 2.

That is, the terminal communication unit 11 receives a probe request transmitted at a predetermined frequency from the IP telephone terminal 2 with the two-way antenna 11a at the time of establishing a wireless link. The terminal communication unit 11 transmits a probe response when the ESSID information included in the probe request agrees with the ESSID of the access point 1.

The terminal communication unit 11 of the access point 1 which has established a wireless link with the IP telephone terminal 2 after a handover, detects the end of the call between the IP telephone terminal 2 and the call destination terminal 3. That is, when a disconnect request of the call is sent from the IP telephone terminal 2 to the SIP server 6, the terminal communication unit 11 transmits an IP address obtainment request for instructing the obtainment of the IP address of the same network address as that of the subnetwork in which the access point 1 is connected to the IP telephone terminal 2.

The access point communication unit 12 is connected to, for example, the wired LAN 5 to perform the transmission and the reception of various kinds of information among the plurality of access points 1 connected to the wired LAN 5.

Concretely, the access point communication unit 12 transmits a connection instruction by IP tunneling with the initial access point to the handover destination access point at the time of changing the access point 1 to which the IP telephone terminal 2 is connected. That is, when the terminal communication unit 11 of the initial access point (for example, the first access point 1A) receives the information of a handover destination transmitted from the IP telephone terminal 2, the terminal communication unit 11 transmits the start request of the IP tunneling with the initial access point to the handover destination access point (for example, the second access point 1B or the like).

When another handover of the access point 1 is performed, the access point communication unit 12 of the handover destination access point (for example, the second access point 1B or the like) transmits an IP tunneling change request (change instruction) for setting a new handover destination access point (for example, the third access point 1C or the like) as a new connection destination of tunneling, to the initial access point (for example, the first access point 1A or the like).

The access point communication unit 12 of the handover destination access point (the new handover destination access point after another handover) transmits the IP tunneling change request to the initial access point whenever a handover is performed.

The access point communication unit 12 of the handover destination access point (the new handover destination access point) which has established a wireless link with the IP telephone terminal 2 after a handover, transmits an IP tunneling release request instructing the release of IP tunneling to the initial access point when a call between the IP telephone terminal 2 and the call destination terminal 3 ends.

The access point communication unit 12 of the initial access point transmits an instruction of connection with the initial access point by the IP tunneling to a new handover destination access point at every time of receiving an IP tunneling change request transmitted from the access point communication unit 12 of the handover destination access. That is, the initial access point transmits the start request of the IP tunneling with the initial access point to the new handover destination access point (for example, the third access point 1C), after the release of the IP tunneling with the handover destination access point (for example, the second access point 1B) by the tunneling processing unit 13.

The tunneling processing unit 13 controls the packet communication of data with another access point 1 by forming IP tunneling with another access point 1 and by releasing the IP tunneling.

Concretely, the tunneling processing unit 13 of a handover destination access point connects the handover destination access point with the initial access point by the IP tunneling in a state capable of performing data communication, based on the reception of the start request of IP tunneling (connection instruction) transmitted from the initial access point, by the access point communication unit 12. The tunneling processing unit 13 of the handover destination access point (the new handover destination access point after another handover) then receives the data transmitted from the IP telephone terminal 2 and then transmits the data to the initial access point through the IP tunneling until the end of a call between the call destination terminal 3 and the IP telephone terminal 2.

The tunneling processing unit 13 of the initial access point transmits the data transmitted from the call destination terminal 3 to the IP telephone terminal 2, to the handover destination access point through IP tunneling until the end of a call between the IP telephone terminal 2 and the call destination terminal 3.

Further, the tunneling processing unit 13 of the initial access point releases the IP tunneling connecting the initial access point with any of the handover destination access points based on an IP tunneling change request and an IP tunneling release request, from the handover destination access point (the new handover destination access point after another handover).

In the following, the packet structure of the data pertaining to tunneling processing is described with reference to FIGS. 4, 5A and 5B.

FIG. 4 is a diagram schematically showing the general packet structure of data that is transmitted and received by packet communication. FIG. 5A is a diagram schematically showing the general packet structure of data that is transmitted and received through IP tunneling, and FIG. 5B is a diagram schematically showing the packet structure of data that is transmitted and received through the IP tunneling of the present embodiment.

Figure 5A:
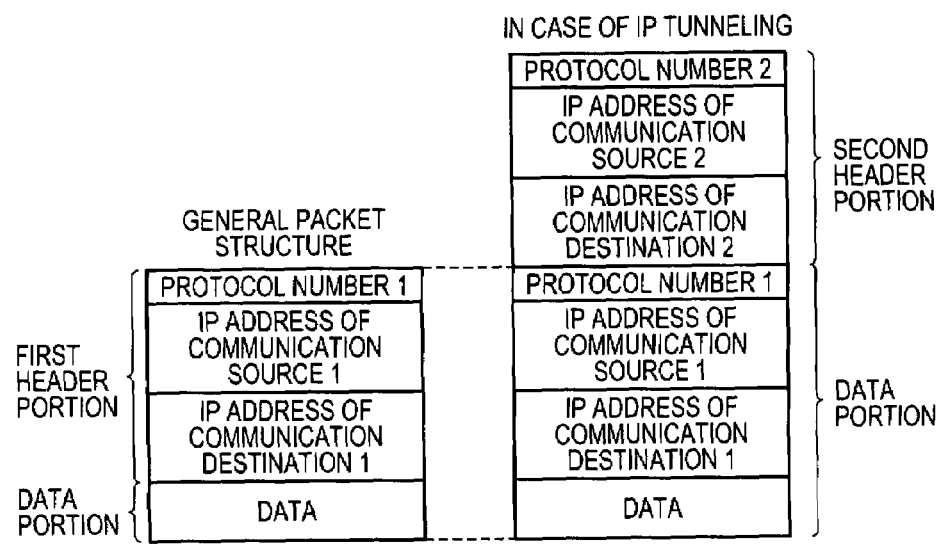
FIG. 5A is a diagram schematically showing the packet structure of the data which is transmitted and received through a common IP tunneling.
Figure 5B:
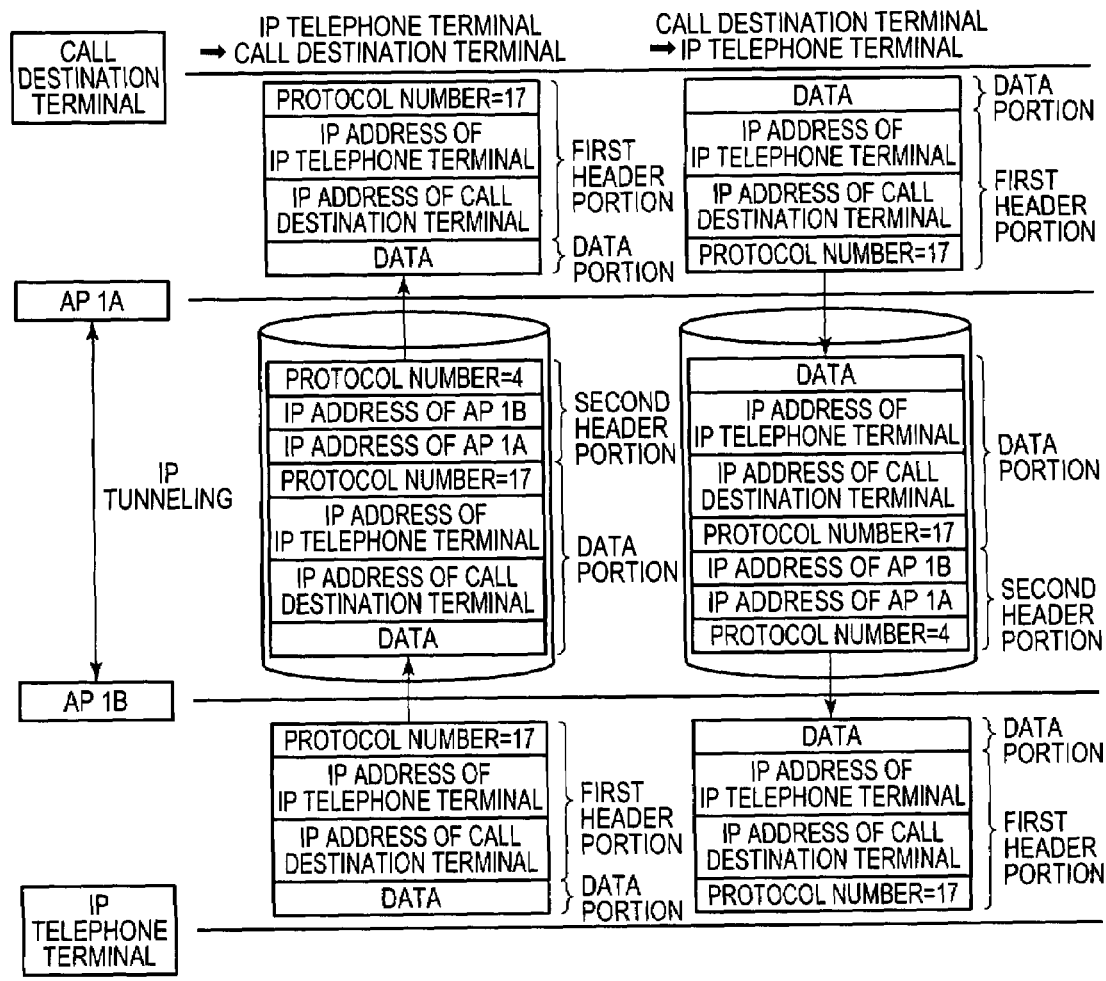
FIG. 5B is a diagram schematically showing the packet structures of the data which is transmitted and received in the IP telephone system of FIG. 1.

The header portion is simplified to be expressed as "protocol number", "IP address of communication source terminal" and "IP address of communication destination" in FIGS. 5A and 5B.

First, the general data subjected to packet communication has the packet structure composed of a "data portion", an "IP header portion" and the like, as shown in FIG. 4.

The "data portion" is a data portion subjected to communication as an IP packet, and the "IP header portion" is placed before the "data portion".

The "IP header portion" is more concretely composed of a "version", a "header length", a "service type", a "datagram length", an "ID", "flags", a "fragment offset", a "TTL", a "protocol number", a "header checksum," an "IP address of a communication source terminal," an "IP address of a communication destination terminal," "options", and the like.

The "version" expresses the version of an IP protocol. The "header length" expresses the size of the IP header portion. The "service type" expresses the type of service (TOS) such as the priority of the IP packet. The "datagram length" expresses the whole size of the IP packet. The "ID" expresses a numerical value for identifying the IP packet, and is used for IP fragmentation. The "flags" and the "fragment offset" express flag information in fragmentation. The "TTL" expresses the span of life of the IP packet. The "protocol number" expresses the kind of the network protocol of the higher rank transport layer. The "header checksum" is the checksum of the header portion. The "options" expresses additional functional information.

On the other hand, the data subjected to packet communication through IP tunneling has the structure of, as shown in FIG. 5A, a "data portion" and a "second header portion" attached to the "data portion".

The "data portion" is the whole data in the packet structure, of general data.

The "second header portion" is a header portion corresponding to "IP header portion" (the first header portion). The "second header portion" has approximate the same structure as that of "IP header portion", and concretely, is composed of a "protocol number," an "IP address of a communication source," an "IP address of a communication destination," and the like, as shown in FIG. 5A.

In a state that the access points 1 are connected with one another through IP tunneling, as shown in FIG. 5B, when data is transmitted from the IP telephone terminal 2 to the call destination terminal 3 through a path: the second access point 1B→IP tunneling→the first access point 1A, then the "IP address of an IP telephone terminal" is attached to the "IP address of the communication source terminal 1" of the IP header portion of a general packet, and the "IP address of a call destination terminal" is attached to the "IP address of the communication destination 1."

The tunneling processing unit 13 of the second access point 1B on the side of the communication source performs processing of adding the second header portion to a general packet, in which the "IP address of second access point 1B" is attached to an "IP address of communication source terminal 2" and the "IP address of first access point 1A" is attached to an "IP address of communication destination 2." The data that is transmitted from the IP telephone terminal 2 and is received in the second access point 1B is thereby sent to the first access point 1A through the IP tunneling.

The tunneling processing unit 13 of the first access point 1A on the side of the communication destination then performs the processing of removing the second header portion added to the general packet in tunneling processing unit 13 of the second access point 1B. The packet received by the first access point 1A is transmitted to the call destination terminal 3 through the network circuit N.

On the other hand, when data is transmitted from the call destination terminal 3 to the IP telephone terminal 2 through the path: the first access point 1A→the IP tunneling→the second access point 1B, the "IP address of call destination terminal" is attached to the "IP address of the communication source terminal 1" of the general packet, and the "IP address of IP telephone terminal" is attached to the "IP address of the communication destination 1."

The tunneling processing unit 13 of the first access point 1A on the side of the communication source performs the processing of adding the second header portion to the general packet, in which second header portion, the "IP address of the first access point 1A" is attached to the "IP address of communication source terminal 2" and the "IP address of the second access point 1B" is attached to the "IP address of the communication destination 2." The data which is transmitted from the call destination terminal 3 and is received in the first access point 1A is thereby transmitted to the second access point 1B through the IP tunneling.

The tunneling processing unit 13 of the second access point 1B on the side of the communication destination then performs the processing of removing the first header portion added to the general packet in the tunneling processing unit 13 of the first access point 1A. The data received by the second access point 1B is transmitted to the call destination terminal 3 through the network circuit N.

In case of a general packet carrying sound data, a user datagram protocol (UDP) type protocol is used, and, for example, "17" is attached as the protocol number 1.

For example, "4" or the like, which is not used in a general packet, is used to the packet which communicated through the IP tunneling, as a protocol number 2 for distinguishing the packet from the general packet.

The control unit 14 is composed of a central processing unit (CPU), a random access memory (RAM), a read only memory (ROM), and the like, each being not shown, and wholly controls each unit.

The detailed description of the call destination terminal 3 is omitted. Any terminal can be used as the call destination terminal 3 as long as the terminal can call the IP telephone terminal 2, and the terminal may be, for example, an IP telephone terminal, a fixed-line telephone terminal, a cellular phone terminal or the like.

Next, the handover processing of the IP telephone system 100 is described with reference to FIGS. 6-10.

Figure 7:
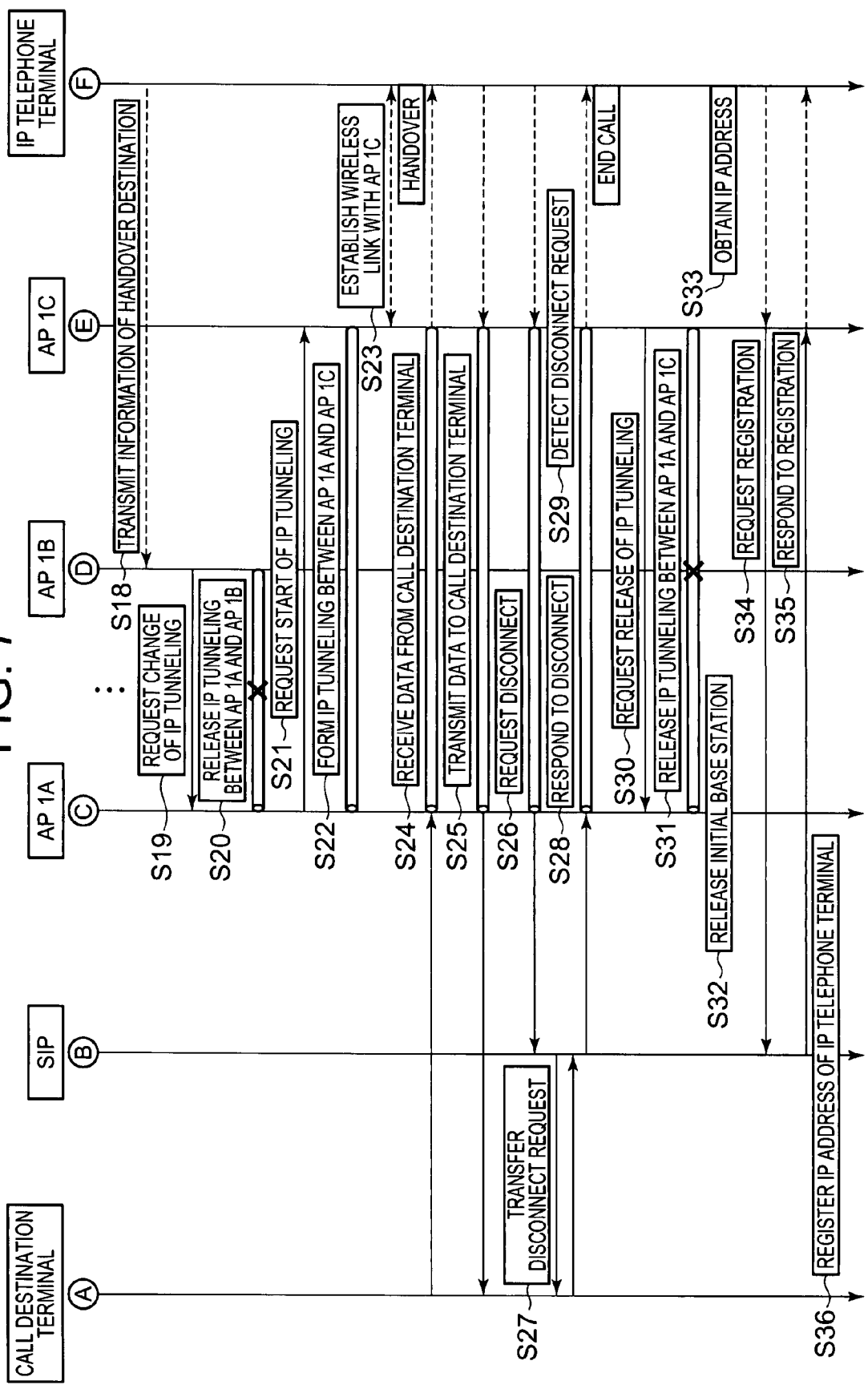
FIG. 7 is a diagram showing a continuation of the handover processing of FIG. 6.
Figure 8:
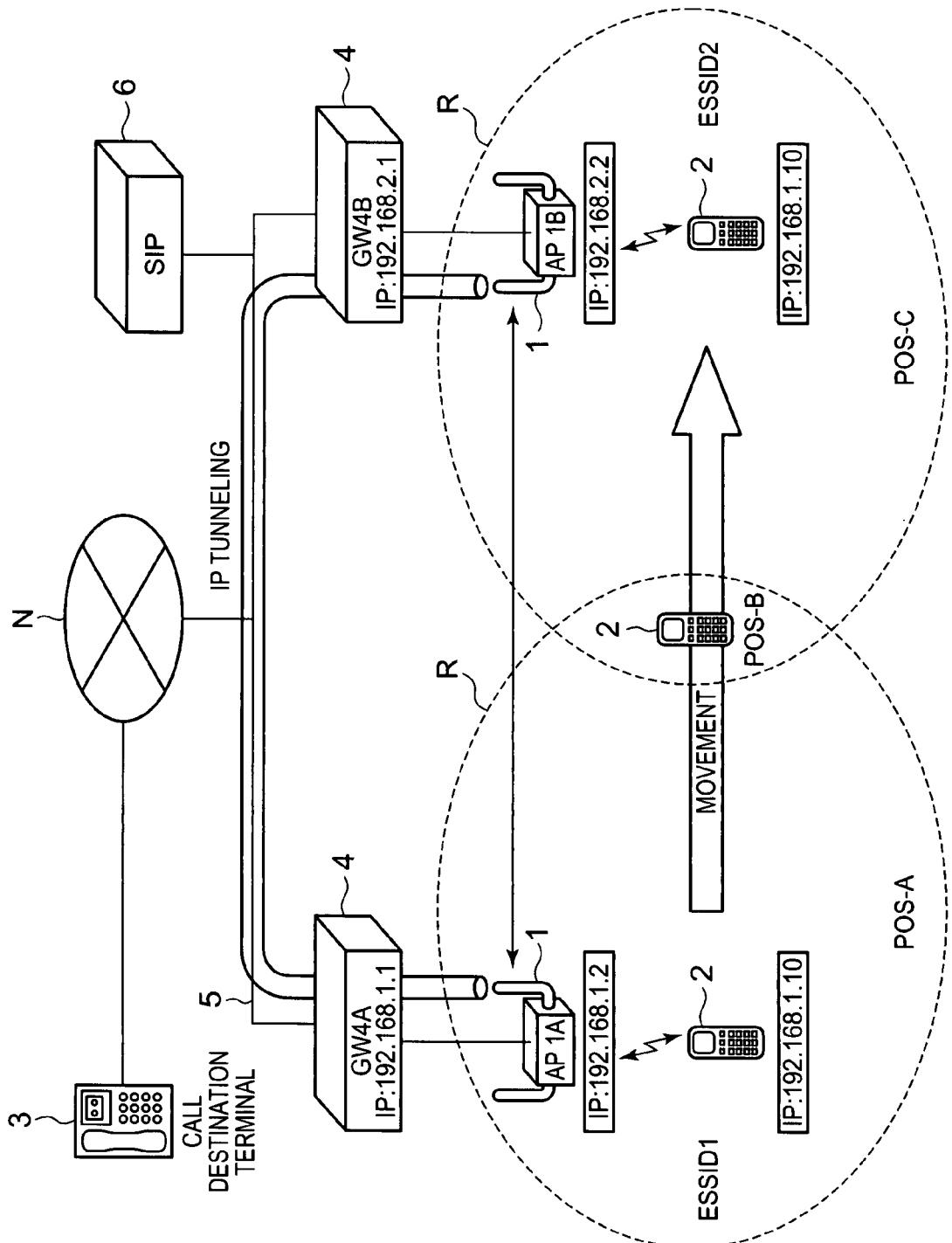
FIG. 8 is a view schematically showing a state of the IP telephone system in the handover processing of FIG. 6.
Figure 9:
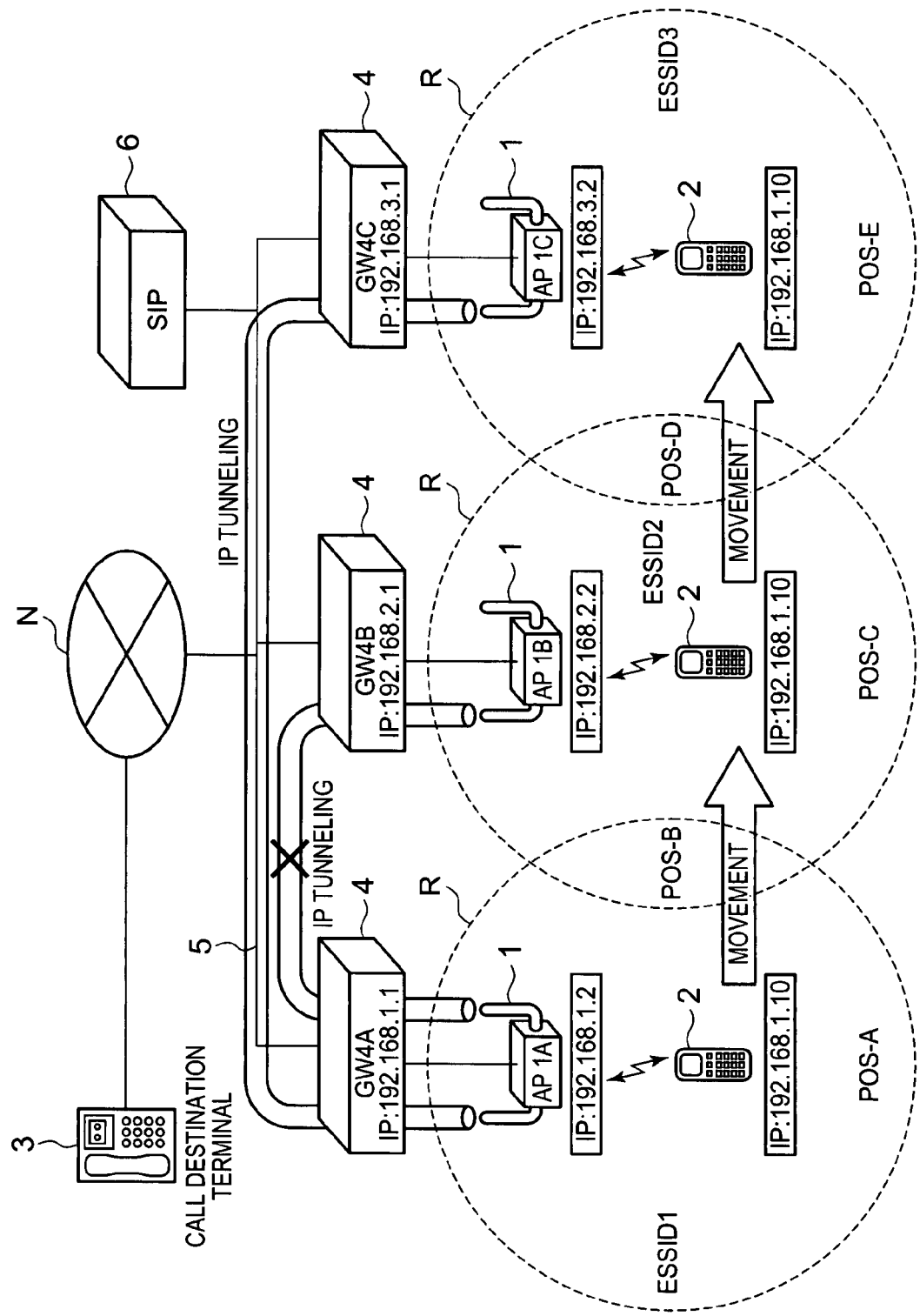
FIG. 9 is a view schematically showing another state of the IP telephone system in the handover processing of FIG. 6.
Figure 10:
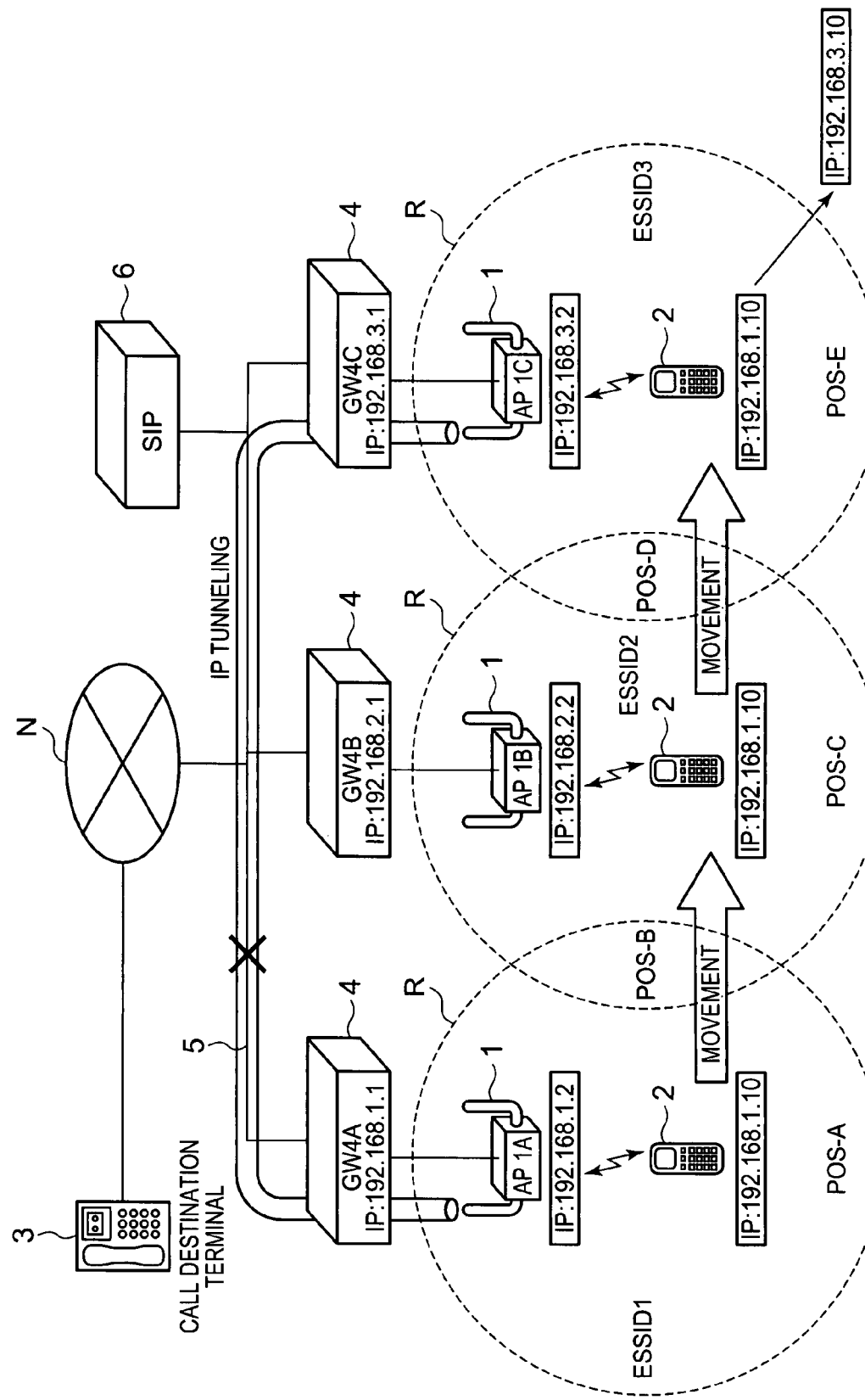
FIG. 10 is a view schematically showing a further state of the IP telephone system in the handover processing of FIG. 6.

FIGS. 6 and 7 are diagrams showing an example of the operation pertaining to handover processing. FIGS. 8-10 are diagrams schematically showing the states of the IP telephone system 100 in the handover processing in FIGS. 6 and 7.

The wireless communication between the access points 1 and the IP telephone terminal 2 is denoted by a broken line, and the wire communication between access points 1 and between the access points 1 and the call destination terminal 3 is denoted by a "solid line" in FIGS. 6 and 7.

At a call with the call destination terminal 3, the IP telephone terminal 2 performs the retrieval of the access points 1 which can establish wireless links at all the identifiers "ESSID" and frequency channels. Concretely, when the power source of the IP telephone terminal 2 is activated, the wireless communication processing unit 21 transmits the probe request of the predetermined identifier "ESSID" at the predetermined frequency channel from the two-way antenna 21a.

When the plurality of access points 1 receives the probe request with the two-way antennas 11a of the terminal communication units 11, the access point 1 (for example, the first access point 1A having the identifier "ESSID 1" or the like) having the identifier agreeing with the identifier (for example, "ESSID 1" or the like) included in the probe request transmits a probe response to the probe request.

When the IP telephone terminal 2 receives the probe response with the two-way antenna 21a, the access point designation unit 22 of the IP telephone terminal 2 detects the received power level of the probe response, and designates the access point 1 having the highest received power level as the access point 1 of the connection destination (for example, the first access point 1A or the like). The wireless communication processing unit 21 then transmits an association request from the two-way antenna 21a in order to establish a wireless link with the designated access point 1.

By the transmission of an association response by the first access point 1A to be the connection destination to the association request received by the two-way antenna 11a of the terminal communication unit 11, a wireless link is established between the access point 1A and the IP telephone terminal 2 (Step S1; see FIG. 6).

The wireless communication processing unit 21 of the IP telephone terminal 2 transmits a DHCP obtainment request to the DHCP server through the first access point 1A, and obtains the IP address "IP: 192.168.1.10" in the subnetwork to which the access point 1A is connected from the DHCP server (Step S2).

The IP telephone terminal 2 then transmits a registration request (for example, a telephone number, an IP address and the like) to the SIP server 6 through the first access point 1A (Step S3).

When the SIP server 6 receives the registration request, the SIP server 6 responds to the registration request (Step S4), and registers the IP address and the telephone number of the IP telephone terminal 2 in association with each other (Step S5).

At this time point, any initial access points are not yet determined.

After that, when the IP telephone terminal 2 moves and the received power level of the signals from the access points 1 varies, the IP telephone terminal 2 forms a wireless link with the access point 1 having the highest power level. In the case that the IP telephone terminal 2 forms a wireless link with another access point 1 beyond the subnetwork, the obtainment of the IP address from the DHCP server is performed and the registration of the IP address in the SIP server 6 is performed again.

Thereafter, when a user operates a call start button (not shown) in the operation unit of the IP telephone terminal 2, the wireless communication processing unit 21 transmits a call request to the SIP server 6 through the first access point 1A (Step S6).

The first access point 1A monitors the call request transmitted from the IP telephone terminal 2 with which a wireless link is formed here, and the first access point 1A recognizes that the first access point 1A itself is the initial access point and the start of a call by detecting the call request (Step S7).

Moreover, when the SIP server 6 transmits the received call request to the call destination terminal 3 (Step S8) and receives the call response signal to the call request which call response signal is transmitted from the call destination terminal 3, the SIP server 6 transmits the call response signal to the IP telephone terminal 2 through the first access point 1A (Step S9).

Instead of monitoring the call request by the first access point 1A, there may be adopted the configuration of the IP telephone terminal 2 informing the access point 1A of the fact that the access point 1A is "the initial access point" when the IP telephone terminal 2 transmits the call request.

Instead of performing the call request by the IP telephone terminal, the call destination terminal 3 may be configured to perform the call request.

The IP telephone terminal 2 starts the call (communication) with the connected call destination terminal 3 through the SIP server 6, and the transmission and the reception of data with the call destination terminal 3 through the first access point 1A are performed (Steps S10 and S11).

Concretely, the IP telephone terminal 2 transmits the call request including the telephone number of the call destination terminal 3 to the SIP server 6, and the SIP server 6 retrieves the IP address of the call destination terminal 3 based on a telephone number-IP address correspondence table carried by the SIP server 6 itself to transmit the call request to the retrieved IP address of the call destination terminal 3, although those configurations are not shown. When the call destination terminal 3 receives the call request and a user of the call destination terminal 3 pushes the call start button or the like of the call destination terminal 3, the call destination terminal 3 transmits a call response to the IP telephone terminal through the SIP server 6.

The access point designation unit 22 of the IP telephone terminal 2 then detects the received power level of the signal that was transmitted from the first access point 1A and received by the two-way antenna 21*a* at predetermined timing, and judges whether or not the received power level is equal to or less than a predetermined value.

When the user carrying the IP telephone terminal 2 moves from the position A to the position B here (see FIG. 8), the received power level of a signal from the first access point 1A, which is detected by the access point designation unit 22, becomes gradually lowering. When the received power level is judged to be the predetermined value or less by the access point designation unit 22, the wireless communication processing unit 21 transmits a probe request from the two-way antenna 21*a* relative to all the identifiers "ESSID" for identifying the subnetworks and the frequency channel, and the wireless communication processing unit 21 retrieves the access point 1 being a handover destination. When probe responses from the neighbor access points 1 to the probe request are then received a the access point designation unit 22 detects the received power levels of the probe responses through the two-way antenna 21*a* to specify the access point 1 having the highest received power level as the access point 1 of the handover destination (for example, the second access point 1B).

After that, the wireless communication processing unit 21 transmits the information of the handover destination prescribing the access point 1 of the handover destination from the two-way antenna 21*a* to the first access point 1A (Step S12).

When the first access point 1A receives the information of the handover destination transmitted through the terminal communication unit 11, the access point communication unit 12 transmits a start request of IP tunneling to the second access point 1B of the handover destination (Step S13).

When the second access point 1B receives the start request of the IP tunneling through the access point communication unit 12, the tunneling processing unit 13 connects the second access point 1B with the first access point 1A by IP tunneling in a state capable of performing data communication (Step S14).

Then, by an association response of the second access point 1B to the association request transmitted by using the same identifier "ESSID 2" as that of the second access point 1B from the IP telephone terminal 2, a wireless link is established between the second access point 1B and the IP telephone terminal 2 (Step S15).

At the time of a call between the IP telephone terminal 2 and the call destination terminal 3, the communication data transmitted from the call destination terminal 3 is thereby received by the first access point 1A, and a second header portion is added to the received communication data by the access point 1A. After that, the communication data passes the IP tunneling to be transmitted to the second access point 1B, and the second header portion is removed by the access point 1B. Thereafter, the communication data is transmitted to the IP telephone terminal 2 through the network circuit N (Step S16). On the other hand, the communication data transmitted from the IP telephone terminal 2 is received by the second access point 1B, and a second header portion is added to the received communication data by the access point 1B. After that, the communication data passes the IP tunneling to be transmitted to the first access point 1A, and the second header portion is removed by the access point 1A. Thereafter, the communication data is transmitted to the call destination terminal 3 through the network circuit N (Step S17).

Thereafter, when the user carrying the IP telephone terminal 2 moves from the position C to a position D (see FIG. 9), the received power level of the signal from the IP telephone terminal 2 which level is detected by the access point designation unit 22 becomes gradually lowering.

When the access point 1 of a new handover destination (for example, the third access point 1C or the like) is then designated by the access point designation unit 22 in the way almost similar to that described above, the wireless communication processing unit 21 transmits the information of the handover destination prescribing the access point 1 of the new handover destination from the two-way antenna 21*a* to the second access point 1B (Step S18; see FIG. 7).

When the second access point 1B receives the information of the handover destination through the terminal communication unit 11, the access point communication unit 12 transmits an IP tunneling change request for setting the third access point 1C of the new handover destination as a new connection destination of tunneling to the first access point 1A (Step S19).

When the first access point 1A receives the IP tunneling change request through the access point communication unit 12, the tunneling processing unit 13 thereof releases the IP tunneling connecting the first access point 1A with the second access point 1B (Step S20).

The access point communication unit 12 of the access point 1A transmits a start request of IP tunneling to the third access point 1C of the new handover destination (Step S21).

When the third access point 1C receives the start request of IP tunneling through the access point communication unit 12, the tunneling processing unit 13 of the third access point 1C connects the third access point 1C with the first access point 1A through the IP tunneling in the state capable of performing data communication (Step S22).

By an association response of the third access point 1C to the association request transmitted from the IP telephone terminal 2 using the same identifier "ESSID 3" as that of the third access point 1C, a wireless link is established between the third access point 1C and the IP telephone terminal 2 (Step S23).

At the time of a call between the IP telephone terminal 2 and the call destination terminal 3, the communication data transmitted from the call destination terminal 3 is thereby received by the first access point 1A, and a second header portion is added to the communication data by the access point 1A. Thereafter, the communication data passes through the IP tunneling to be transmitted to the third access point 1C, and the second header portion is removed in the access point 1C. Thereafter, the communication data is transmitted to the IP telephone terminal 2 (Step S24). On the other hand, the communication data transmitted from the IP telephone terminal 2 is received by the third access point 1C, and a second header portion is added to the communication data in the access point 1C. Thereafter, the communication data passes through the IP tunneling to be transmitted to the first access point 1A, and the second header portion is removed in the access point 1A. After that, the communication data is transmitted to the call destination terminal 3 via the network circuit N (Step S25).

After that, when the user operates the call ending button (not shown) in the operation unit of the IP telephone terminal 2, the wireless communication processing unit 21 transmits a disconnect request signal to the SIP server 6 through the third access point 1C, the IP tunneling and the first access point 1A (Step S26).

When the SIP server 6 transmits the received disconnect request signal to the call destination terminal 3 (Step S27) and receives a disconnect response signal transmitted from the call destination terminal 3 to the disconnect request, the SIP server 6 transmits the disconnect response signal to the IP telephone terminal 2 through the first access point 1A, the IP tunneling and the third access point 1C (Step S28).

The third access point 1C monitors the disconnect request signal transmitted from the IP telephone terminal 2 to which a wireless link is formed, and when the third access point 1C detects the disconnect request signal (Step S29), the access point communication unit 12 transmits an IP tunneling release request to the first access point 1A after the end of the call between the IP telephone terminal 2 and the call destination terminal 3 (Step S30; see FIG. 10).

When the first access point 1A receives an IP tunneling release request through the access point communication unit 12, the tunneling processing unit 13 releases the IP tunneling connecting the first access point 1A with the third access point 1C (Step S31).

The function of the first access point 1A as the initial access point is released (Step S32).

After the end of the call, the wireless communication processing unit 21 of the IP telephone terminal 2 obtains the IP address "IP: 192.168.3.10" in the subnetwork to which the third access point 1C is connected, from the DHCP server through the third access point 1C (Step S33; see FIG. 10).

The IP telephone terminal 2 then transmits a registration request to the SIP server 6 through the third access point 1C (Step S34).

When the SIP server 6 receives the registration request from the IP telephone terminal 2, the SIP server 6 responds to the registration request (Step S35), and registers the IP address and the telephone number of the IP telephone terminal 2 in association with each other (Step S36).

In place of the user's operation of the call ending button (not shown) of the operation unit of the IP telephone terminal 2, it may be adopted to operate the call ending button of the communication destination terminal 3. In this case, the third access point 1C can recognize the end of a call based on the detection of the disconnect request signal transmitted from the call destination terminal 3.

As described above, according to the IP telephone system 100 of the first embodiment, a initial access point and a handover destination access point can be connected with IP tunneling at the time of handover. The re-obtainment of the IP address of the same network address as that of the access point 1 of the handover destination after the handover is unnecessary, and the obtainment processing of a new IP address from the DHCP server, IP address change request processing to the SIP server 6 and the call destination terminal 3, and the IP address change processing of the IP telephone terminal 2 in the call destination terminal 3 is unnecessary to make possible to greatly reduce the time from ceasing of a call to the reopening thereof.

As a result, the IP telephone system 100, which has less sound breaks or negligible sound breaks even when handover is performed, can be realized more inexpensively.

Even when the IP telephone terminal 2 moves between different subnetworks to perform handover again, the initial access point and the new handover destination access point can be connected again with new IP tunneling. Consequently, even when handover is repeated any number of times, the time from the ceasing of a call to the reopening thereof can be greatly reduced, and the IP telephone system 100 having few sound breaks or negligible sound breaks even when handover is performed can be realized more inexpensively.

By releasing the IP tunneling, which becomes unnecessary by the obtainment of the IP address after a call with the call destination terminal 3, the IP telephone terminal 2 can reduce the load of the processing of the access points 1.

In such a way, the IP telephone system 100, which has few sound breaks or only negligible sound breaks even when handover is performed, can be realized more inexpensively.

First Modified Example

In the following, the IP telephone system of a first modified example is described with reference to FIGS. 11-16.

Figure 11:
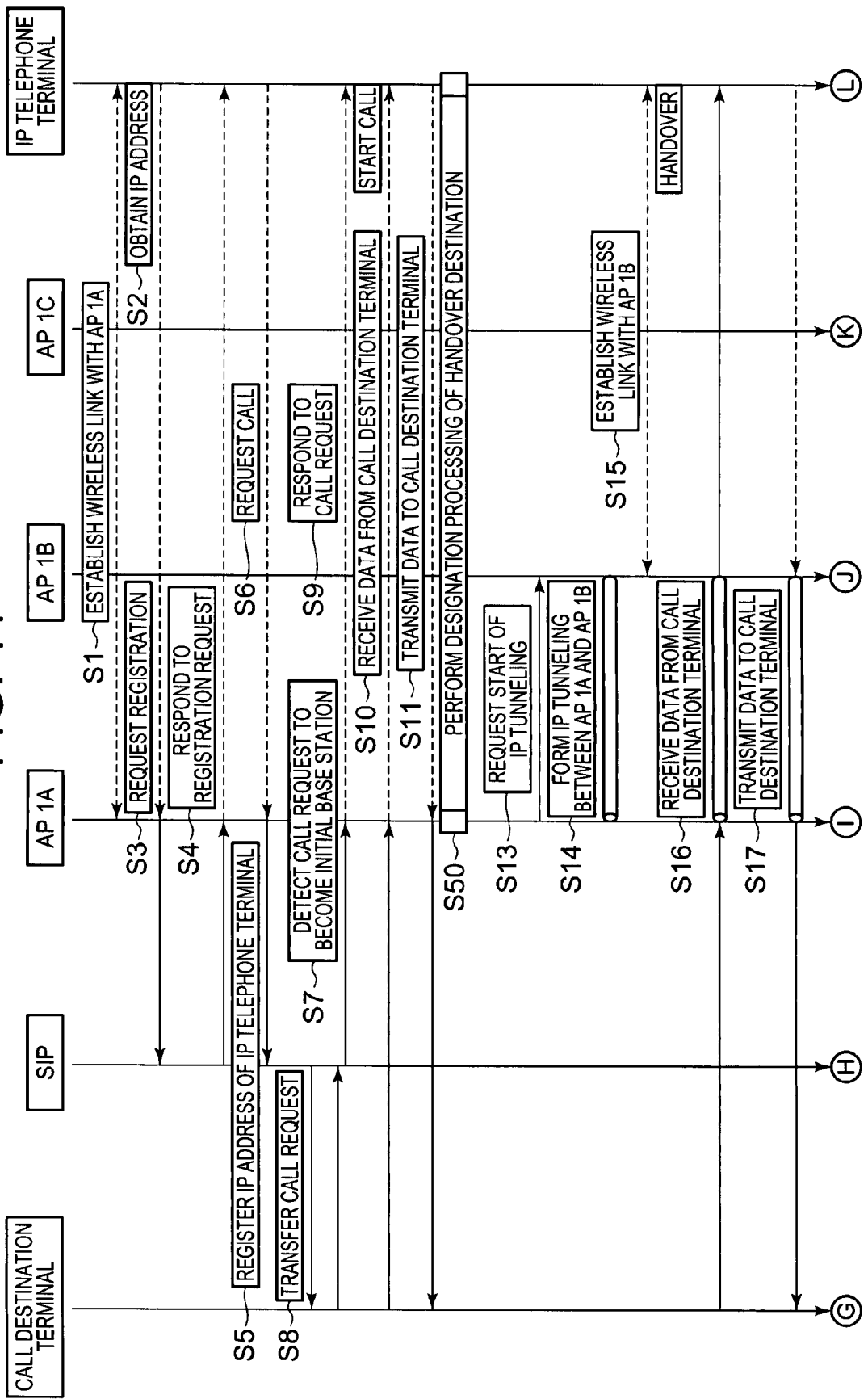
FIG. 11 is a diagram showing an example of the operation of handover processing of an IP telephone system as a first modified example.
Figure 12:
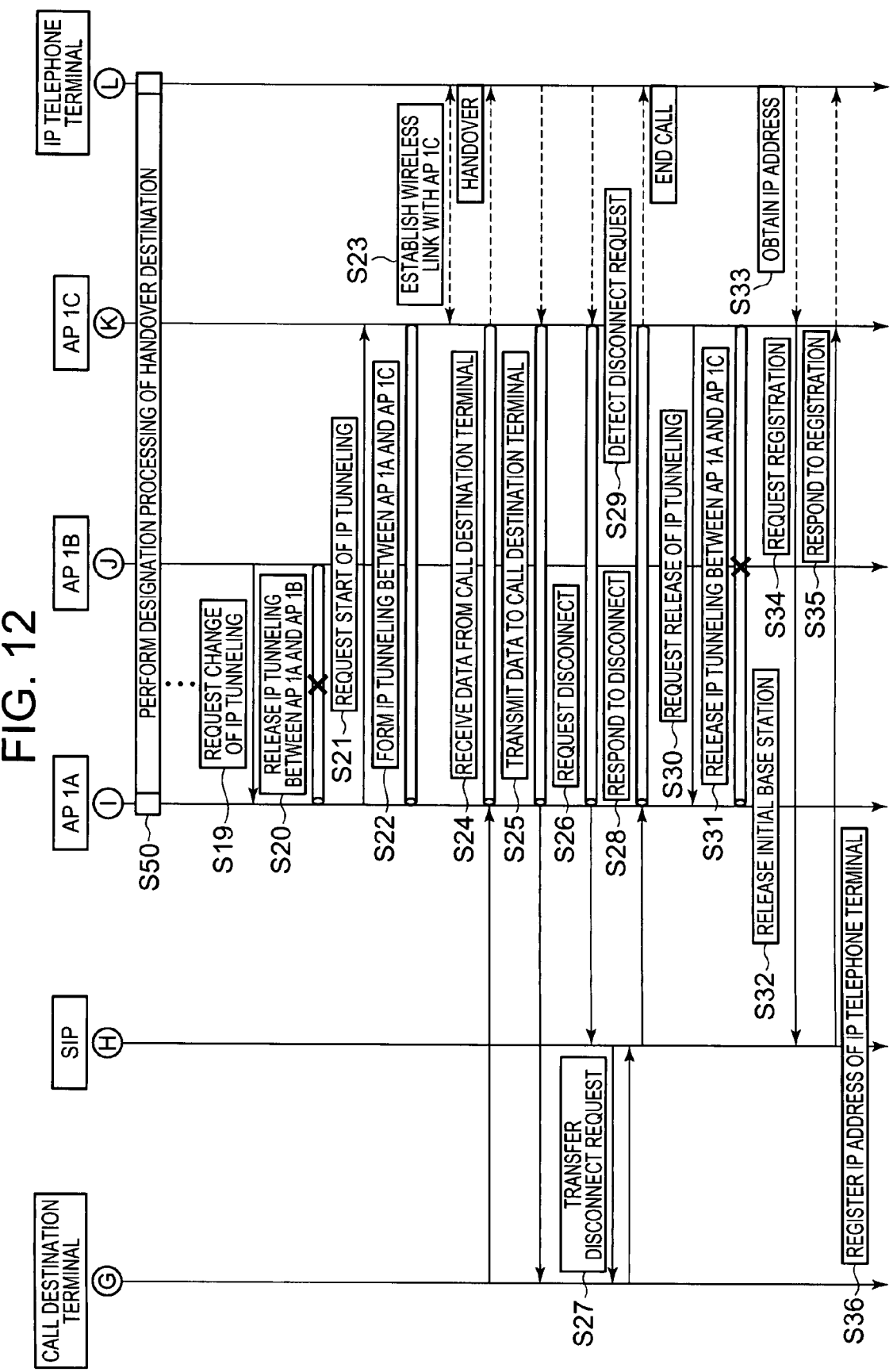
FIG. 12 is a diagram showing a continuation of the handover processing of FIG. 11.
Figure 13:
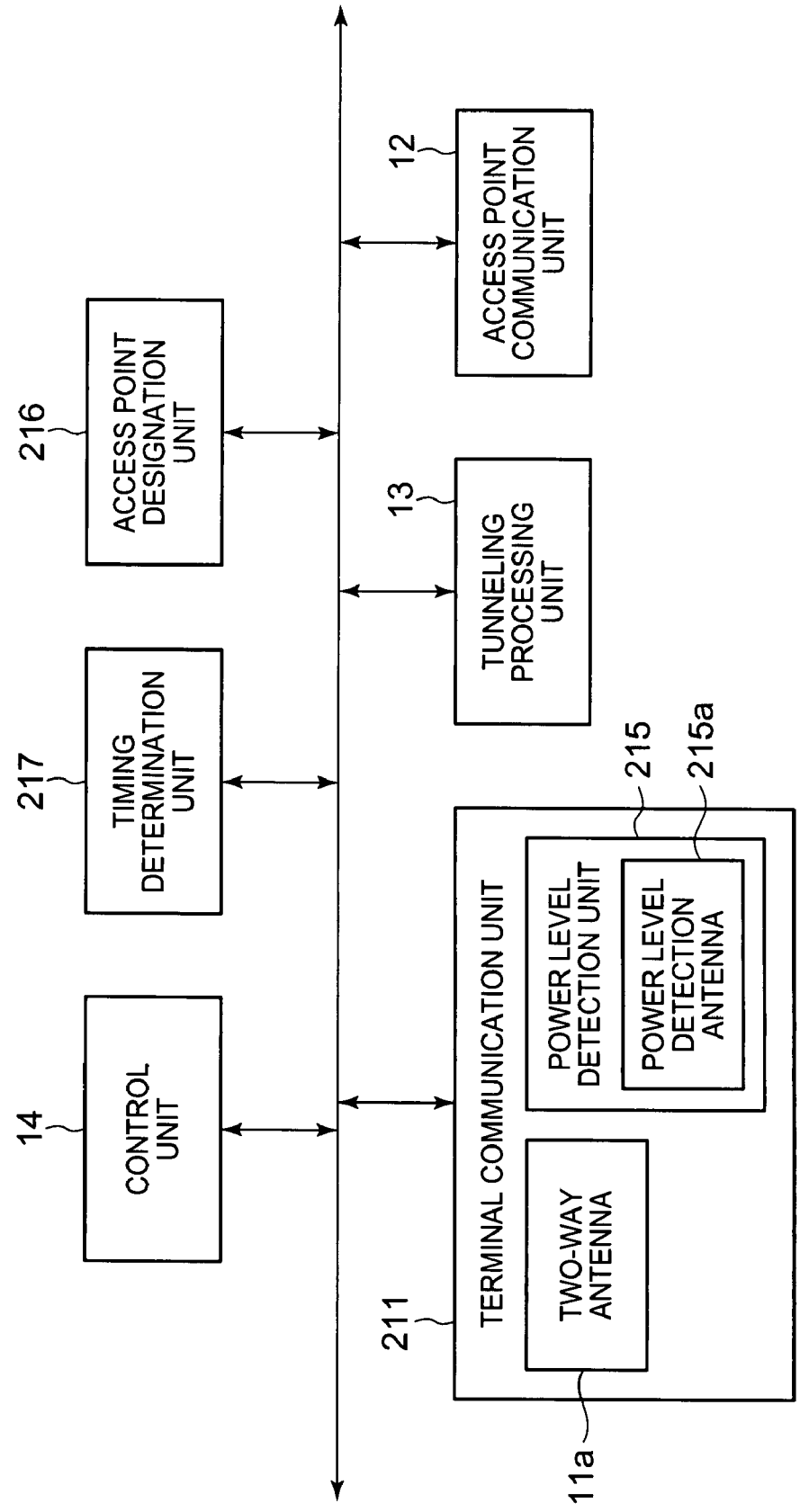
FIG. 13 is a block diagram of an access point constituting the IP telephone system of FIG. 11.
Figure 14:
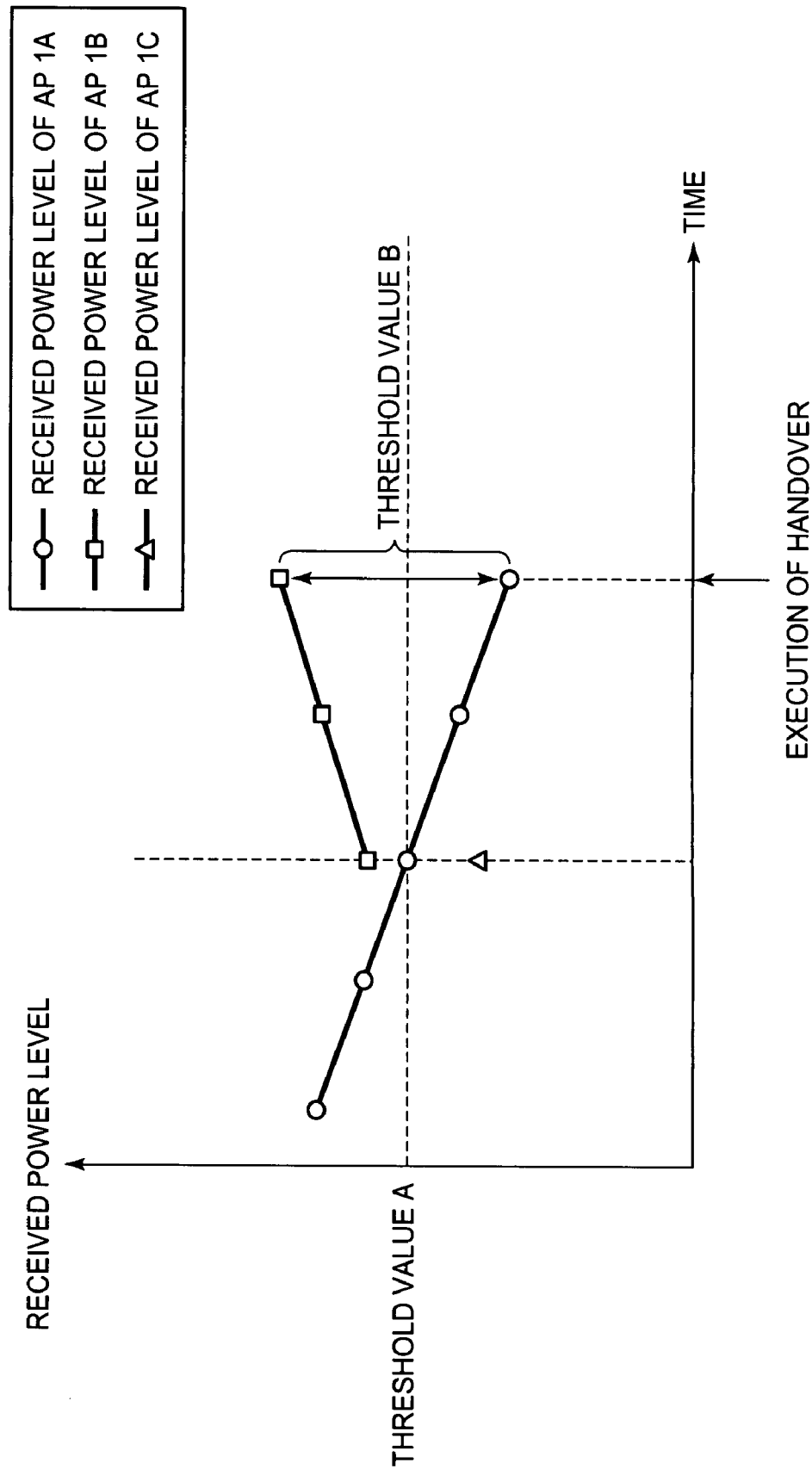
FIG. 14 is a diagram for illustrating the execution timing of a handover performed by the IP telephone system of FIG. 11.
Figure 15:
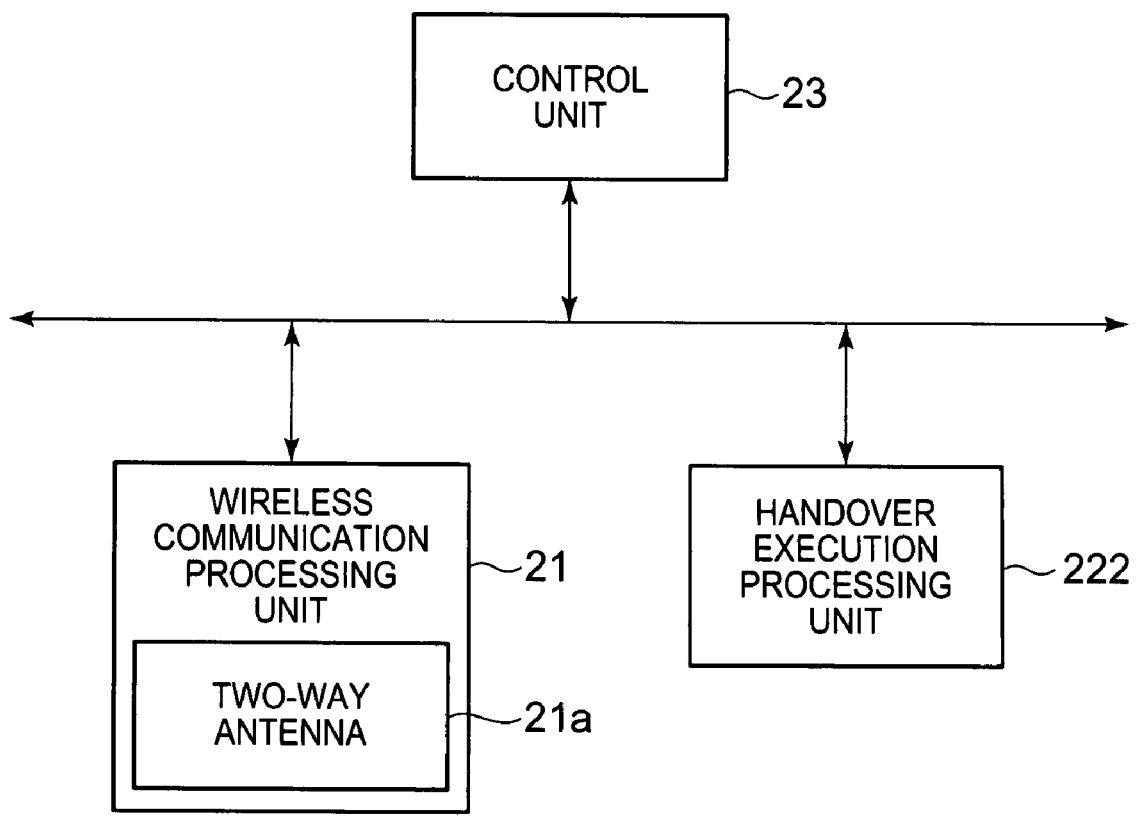
FIG. 15 is a block diagram showing an IP telephone terminal constituting the IP telephone system of FIG. 11.

FIGS. 11 and 12 are diagrams showing an example of the operation pertaining to the handover processing by the IP telephone system of the first modified example. FIG. 13 is a block diagram of an access point 201. FIG. 14 is a diagram illustrating the execution timing of handover by the IP telephone system of the first modified example. FIG. 15 is a block diagram of the IP telephone terminal 202.

Because the IP telephone system of the first modified example is almost the same as the first embodiment described above except for the configuration of the access point 201 and the execution of the designating processing of a handover destination, the similar components are denoted by the same reference marks and their descriptions are omitted.

The IP telephone system of the first modified example performs the designation of a handover destination and the instruction of the execution timing of handover, led mainly by the access point 201 forming a wireless link.

That is, as shown in FIG. 13, the access point 201 is provided with a terminal communication unit 211 including a received power level detection unit 215, an access point designation unit 216, a timing determination unit 217, and the like.

The terminal communication unit 211 obtains a first received power level of a signal transmitted from the IP telephone terminal 202 and received by the two-way antenna 11a at predetermined timing at the time of the transmission and the reception of a signal with the IP telephone terminal 202 to which a wireless link is established.

The terminal communication unit 211 judges whether or not the obtained first received power level is a predetermined value (for example, threshold value A; see FIG. 14) or less.

The threshold value A is here prescribed in consideration of, for example, the communication coverage R of the plurality of access points 201, the received power level of a signal, and the like. Concretely, the threshold value A is prescribed at a degree capable of keeping the predetermined received power level without ceasing communication with the IP telephone terminal 202 in the region in which the communication coverage R of adjoining access points 201 overlaps one another.

After the access point designation unit 216 (described later) has designated the access point 201 of a handover destination, the terminal communication unit 211 transmits the identifier "ESSID", the frequency "CH" and the media access control (MAC) address of the access point 201 of the handover destination to the IP telephone terminal 202.

When the terminal communication unit 211 judges that the difference between the first received power level of the access point 201 connected to the IP telephone terminal 202 (for example, the first access point 1A) and a second received power level of a signal from the IP telephone terminal 202 by the access point 201 of the handover destination (for example, the second access point 1B) is a predetermined value (for example, a threshold value B) or more (the case will be described later), the terminal communication unit 211 transmits the association release signal of the association with the initial access point to the IP telephone terminal 202.

That is, the terminal communication unit 211 transmits the association release signal to the IP telephone terminal 202, for example, when the timing of handover is determined (the details of which will be described later) by the judgment of the difference between the first received power level and the second received power level being the threshold value B or more by the timing determination unit 217. The release of the wireless link with the initial access point and the execution of the handover to the neighbor access point 201 of the handover destination are thereby to be instructed to the IP telephone terminal 202.

That is, when the terminal communication unit 211 judges that the first received power level is the predetermined value or less, the access point communication unit 12 of the initial access point transmits a measurement request signal of the second received power level of the signal transmitted from the IP telephone terminal 202 of the neighbor access point 201 among the plurality of access points 201 to the neighbor access point 201 connected to the wired LAN 5.

The access point communication unit 12 of the access point 201 transmits the second received power level (described below) detected by the received power level detection unit 215 to the initial access point.

The access point communication unit 12 of the initial access point thereby obtains the second received power level of the signal by the neighbor access point 201, transmitted from the IP telephone terminal 202.

The received power level detection unit 215 is the one provided with a received power level detection antenna 215a in order to detect the second received power level of a signal transmitted from the IP telephone terminal 202, to which no wireless link is established.

That is, the received power level detection unit 215 of the neighbor access point 201 detects the second received power level with the received power level detection antenna 215a based on the reception of the measurement request signal transmitted from the access point communication unit 12 of the initial access point. Concretely, in the case where the IP telephone terminal 202 and the first access point 1A establish a wireless link with each other, the received power level detection units 215 of a second and a third access points 1B and 1C, which are located around the IP telephone terminal 202, receive a signal transmitted from the IP telephone terminal 202 at a predetermined frequency with the received power level detection antennas 215a to detect the received power level thereof.

The access point designation unit 216 is the one for designating the access point 201 of a handover destination among the plurality of access points 201.

That is, the access point designation unit 216 of the initial access point designates the access point 201 having the highest received power level as the access point 201 of the handover destination based on the plurality of second received power levels that were detected by the received power level detection units 215 of the neighbor access points 201 and were obtained by the access point communication unit 12 of the wired LAN 5.

The timing determination unit 217 of the initial access point is the one for determining the timing of handover based on the difference between the second received power level by the neighbor access point 201 of the handover destination designated by the access point designation unit 216 and the first received power level of the initial access point.

That is, the timing determination unit 217 of the initial access point obtains the second received power level of the neighbor access point 201 of the handover destination at the predetermined timing, and to judge whether or not the difference between the second received power level and the first received power level of the initial access point is the predetermined value (for example, the threshold value B; see FIG. 14) or more. The timing determination unit 217 determines the time point when the difference of the received power levels is judged to be the threshold value B or more as the execution timing of handover.

Next, the IP telephone terminal 202 is described with reference to FIG. 15.

As shown in FIG. 15, the IP telephone terminal 202 is provided with a handover execution processing unit 222 processing the execution of handover, for example.

The handover execution processing unit 222 processes the release of the wireless link with the initial access point and the execution of the handover to the access point 201 of a handover destination based on, for example, the association release signal transmitted from the initial access point and received by the wireless communication processing unit 21.

The handover processing of the IP telephone system of the first modified example is described with reference to FIGS. 11, 12 and 16.

Figure 16:
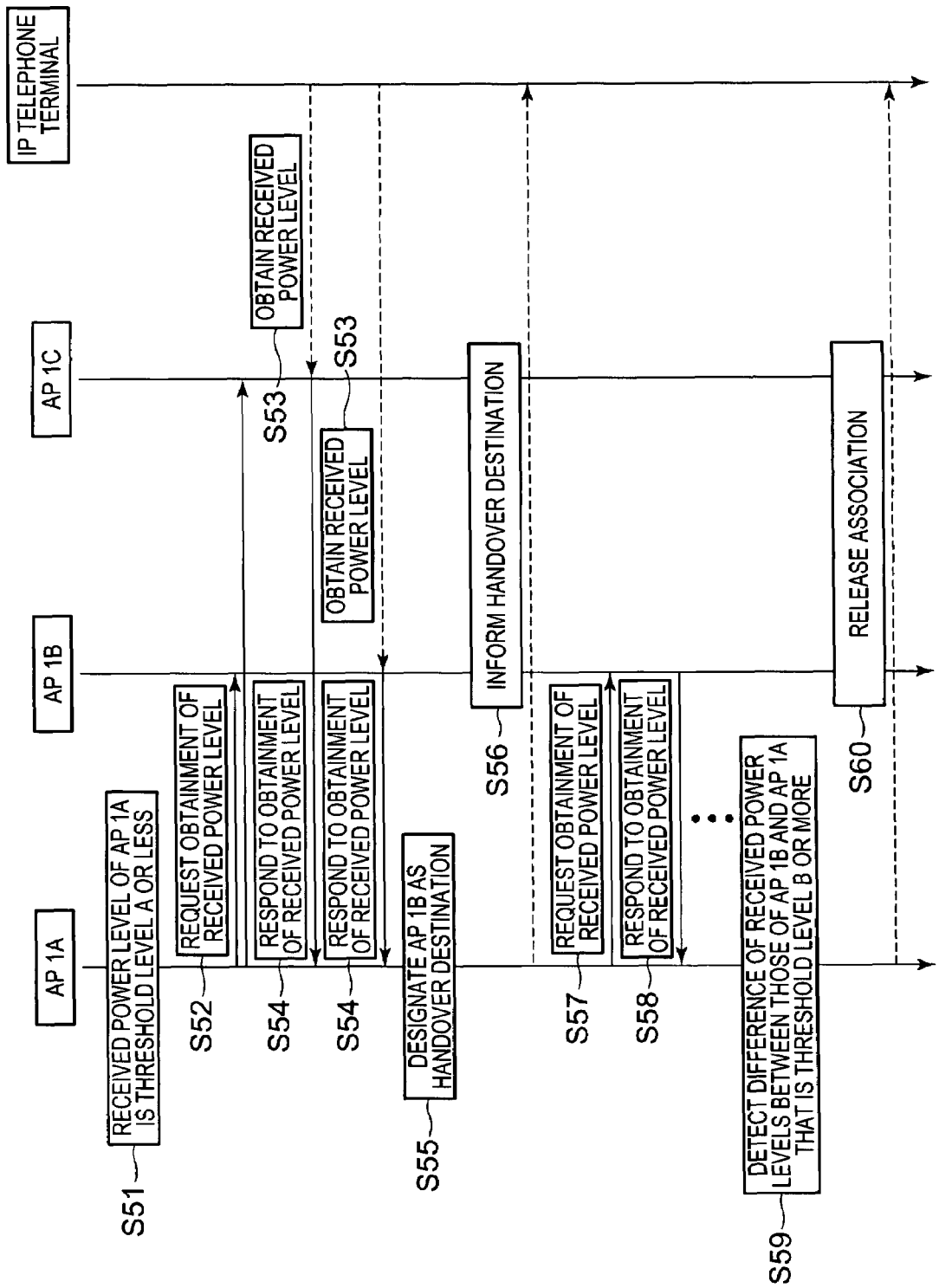
FIG. 16 is a diagram schematically showing the operation of a handover destination designation processing by the IP telephone system of FIG. 11.

FIG. 16 is a diagram schematically showing an example of the operation pertaining to the designating processing of a handover destination by the IP telephone system 100.

As shown in FIGS. 11 and 12, the IP telephone system of the first modified example performs the designation processing of a handover destination led mainly by the first access point 201 when data communication is being performed between the IP telephone terminal 202 and the call destination terminal 3 after the establishment of a wireless link between the first access point 1A and the IP telephone terminal 202 similarly to the IP telephone system 100 of the first embodiment (Steps S1-S11) (Step S50).

In the following, the designating processing of a handover destination is described in detail with reference to FIG. 16.

As shown in FIG. 16, the terminal communication unit 211 of the first access point 1A detects the received power level (first received power level) of a signal transmitted from the IP telephone terminal 202 and received with the two-way antenna 11a at predetermined timing in the state in which a wireless link with the IP telephone terminal 202 is established, and judges whether or not the first received power level is the threshold value A (see FIG. 14) or less.

When a user carrying the IP telephone terminal 202 moves from the position A to the position B, the received power level of the signal from the IP telephone terminal 202, which received power level is detected by the terminal communication unit 211, gradually lowers (see FIG. 14).

When the terminal communication unit 211 then judges that the first received power level is the threshold value A or less (Step S51), the access point communication unit 12 transmits a measurement request signal (detection instruction) of the received power level (second received power level) of the signal transmitted from the IP telephone terminal 202 through the wired LAN 5 to the neighbor access points 201 (for example, the second and the third access points 1B and 1C) (Step S52).

In each of the second and the third access points 1B and 1C, the received power level detection unit 215 receives a signal transmitted from the IP telephone terminal 202 at a predetermined frequency with the received power level detection antenna 215a based on the measurement request signal of a second received power level received by the access point communication unit 12 to detect the received power level (the second received power level) (Step S53).

After that, the access point communication unit 12 transmits the second received power level detected by the received power level detection unit 215 as a received power level obtainment response signal to the first access point 1A (Step S54).

In the first access point 1A, when the access point communication unit 12 thereof receives the respective second received power level transmitted from each of the second and the third access points 1B and 1C, the access point designation unit 216 of the first access point 1A designates the access point 201 having the highest received power level (for example, the second access point 1B) as the access point 201 of the handover destination (Step S55).

The terminal communication unit 211 then transmits (informs) the identifier "ESSID", the frequency "CH", the media access control (MAC) address of the second access point 1B of the handover destination to the IP telephone terminal 202 (Step S56).

Thereafter, the timing determination unit 217 of the first access point 1A obtains the second received power level of the second access point 1B of the handover destination at the predetermined timing, and judges whether or not the difference between the second received power level of the second access point 1B and the first received power level of the first access point 1A is the threshold value B or more.

That is, the terminal communication unit 211 of the first access point 1A detects the first received power level of the signal from the IP telephone terminal 202 at the predetermined timing, and the access point communication unit 12 transmits an obtainment request of the second received power level of the signal from the IP telephone terminal 202 to the second access point 1B (Step S57).

In the second access point 1B, the access point communication unit 12 then transmits the second received power level detected by the received power level detection unit 215 to the first access point 1A as the received power level obtainment response signal (Step S58).

When the terminal communication unit 211 judges that the difference between the first received power level and the second received power level is the threshold value B or more and the timing of the handover is determined (Step S59), the terminal communication unit 211 transmits an association release signal from the two-way antenna 11a to the IP telephone terminal 202 for ending the designating processing of the handover destination (Step S60).

The access point communication unit 12 transmits a start request of IP tunneling to the second access point 1B of the designated handover destination (Step S13; see FIG. 11).

Also in the case where the re-change of the access point 201 of the handover destination is preformed again, the designating processing of the handover destination is designed to be executed at the initiative of the access point 201 that establishes a wireless link with the IP telephone terminal 202 (for example, the second access point 1B or the like).

As described above, according to the IP telephone system of the first modified example, the access point 201 wirelessly connected with the IP telephone terminal 202 can obtain the received power levels of the signal transmitted by the IP telephone terminal 202 by the neighbor access points 201 to specify a handover destination. That is, because each of the access points 201 is provided with the received power level detection unit 215 including the received power level detection antenna 215a in addition to the two-way antenna 11a for the communication with the IP telephone terminal 202, the access point 201 can properly detect the received power level of the signal from another IP telephone terminal 202 even during the communication with a predetermined IP telephone terminal 202. Furthermore, when the difference between the second received power level of a neighbor access point 201 and the first received power level of the connected access point 201 is the threshold value B or more, then the IP telephone system can instruct the execution of handover to the IP telephone terminal 202.

The IP telephone system can consequently properly perform handover at the initiative of the access point 201 without stopping the wireless communication between the IP telephone terminal 202 and the connected access point 201.

Although the first modified example mentioned above provides the received power level detection unit detecting the signal from the IP telephone terminal 202 other than the IP telephone terminal 202 establishing a wireless link with the access point 201 itself to the access point 201 to determine the execution timing of handover, the configuration is not limited to such one. For example, the received power level of the signal from the IP telephone terminal 202 may be detected using the terminal communication unit 211 by changing the frequency of the terminal communication unit 211 of the handover destination access point to the frequency of the wireless communication of the access point 201 establishing a wireless link with the IP telephone terminal 202.

Even in the state in which the handover destination access point establishes a wireless link with another IP telephone terminal 202 with the terminal communication unit 211, the received power level of the signal from the IP telephone terminal 202 from the handover destination access point can be thereby properly performed without any antenna dedicated for received power level detection.

Although the first embodiment and the first modified example that have been described above, each having the configuration of performing re-change (new handover) after a change of an access point, have been exemplified, the present invention is not limited to such a configuration. For example, a system having the configuration of ending a call as it is after the handover from the initial access point to the handover destination access point may be adopted.

Second Embodiment

In the following an IP telephone system 300 of a second embodiment is described with reference to FIGS. 17-20.

Figure 17:
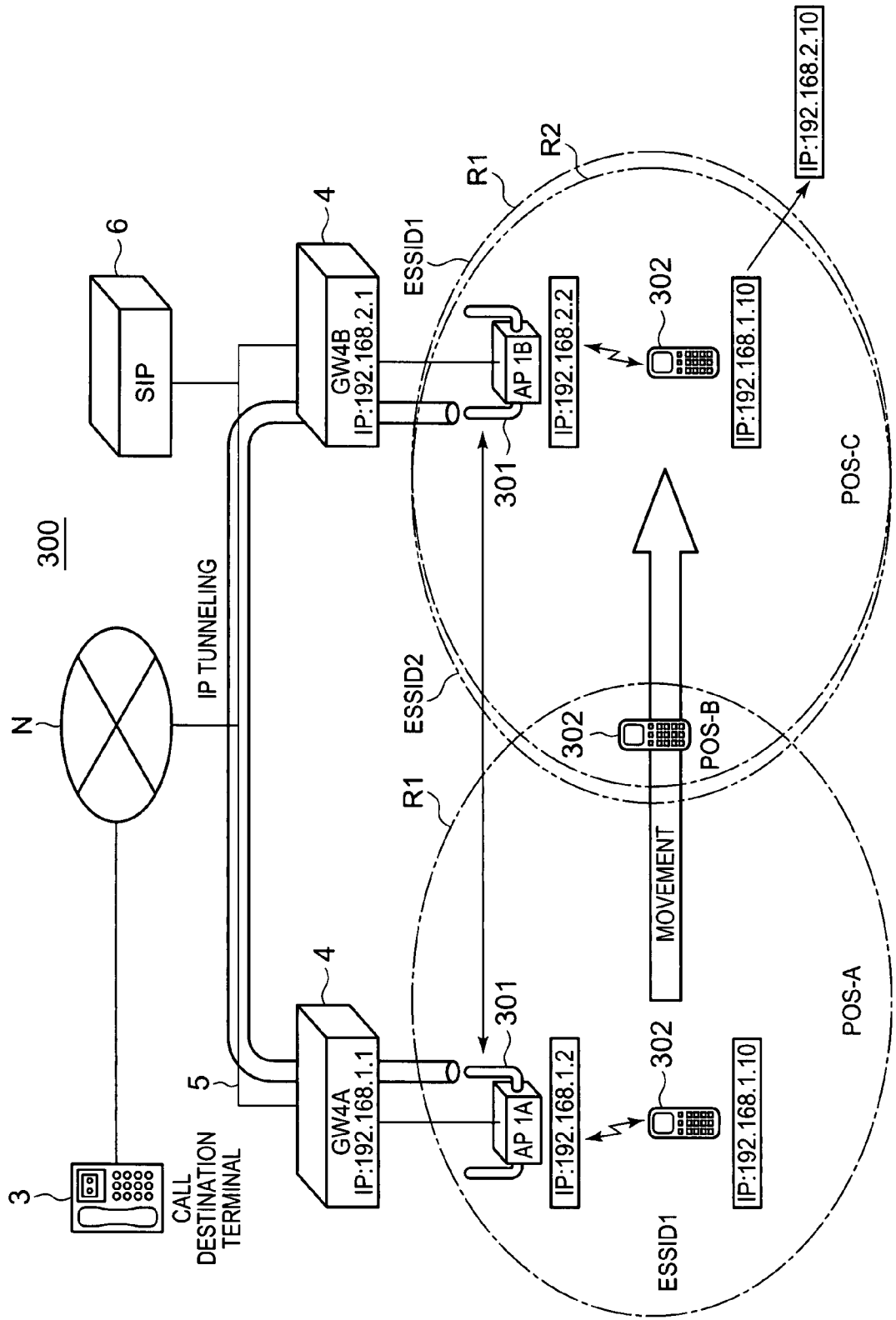
FIG. 17 is a view schematically showing the configuration of an IP telephone system exemplified as a suitable example of the wireless communication system of a second embodiment, to which the present invention is applied.
Figure 18:
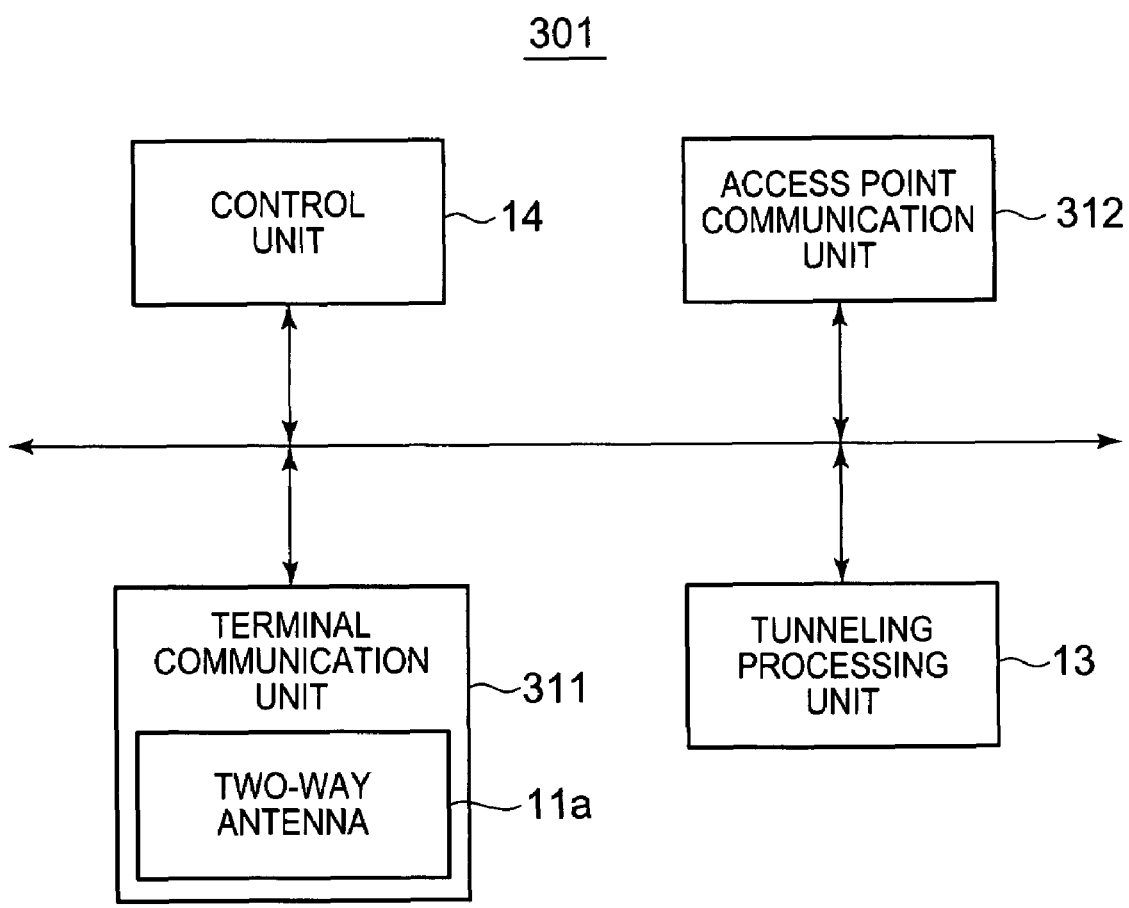
FIG. 18 is a block diagram of an access point constituting the IP telephone system of FIG. 17.

FIG. 17 is here a view schematically showing the schematic configuration of the IP telephone system 300 of the second embodiment to which the present invention is applied. Moreover, FIG. 18 is a block diagram of an access point 301.

Because the IP telephone system 300 of the second embodiment is almost the same as that of the first embodiment mentioned above except for the configuration of the access point 301, the similar components are denoted by the same reference marks and their descriptions are omitted.

The access point 301 of the IP telephone system 300 of the second embodiment is wirelessly connected to an IP telephone terminal 302 through a provisional subnetwork by performing a probe response of the same provisional identifier as that of the subnetwork to which the initial access point is connected to a probe request from the IP telephone terminal 302 at the time of handover as shown in FIG. 17.

It is supposed that the communication coverage R2 of a normal subnetwork of the second access point 1B is denoted by an alternate long and two short dashes line and the communication coverage R1 of a provisional subnetwork is denoted by an alternate long and short dash line in FIG. 17.

When a wireless link with the IP telephone terminal 302 is established, an access point communication unit 312 such as the initial access point (for example, the first access point 1A or the like) produces a provisional ESSID use instruction including the same provisional "ESSID" as the identifier "ESSID" of the subnetwork to which the access point communication unit 312 itself is connected and the MAC address information of the IP telephone terminal 302.

The access point communication unit 312 transmits the produced provisional ESSID use instruction to all of the neighbor access points 301 that are registered in advance through the wired LAN 5.

The neighbor access point (the first access point 1A or the like) connected to the initial access point (for example, the second access point 1B or the like) through the IP tunneling is to be excluded from the transmission object of, for example, the provisional ESSID use instruction.

The access point communication unit 312 of the initial access point (for example, the first access point 1A or the like) produces the provisional ESSID release instruction instructing the release of the use of the provisional "ESSID" after the connection of the access point communication unit with the neighbor access point through the IP tunneling, and to transmit the provisional ESSID release instruction to all of the neighbor access points 301 that are registered in advance.

The neighbor access point (such as the second access point 1B) connected to the initial access point (for example, the first access point 1A or the like) by IP tunneling is to be excluded from, for example, the transmission object of the provisional ESSID release instruction.

A terminal communication unit 311 of the neighbor access point 301 (for example, the second access point 1B or the like) receives the probe request transmitted from the wireless communication processing unit 21 of the IP telephone terminal 302 with the two-way antenna 11a, for example, and to transmit a probe response when the ESSID information included in the probe request and the "ESSID" of the provisional ESSID use instruction transmitted from the initial access point and received by the access point communication unit 312 agree with each other. Concretely, when the terminal communication unit 311 receives the probe request, the terminal communication unit 311 transmits the prove response when the MAC address and the identifier "ESSID" of the IP telephone terminal 302 transmitted the probe request agree with the MAC address and the identifier "ESSID" of the provisional ESSID use instruction, respectively.

The IP telephone terminal 302 thereby identifies the access point 301 of the handover destination, and to establish a wireless link with the access point 301 through the provisional subnetwork. The terminal communication unit 311 is then configured to perform wireless communication with the IP telephone terminal 302 through the provisional subnetwork corresponding to the "ESSID" of the provisional ESSID use instruction.

The terminal communication unit 311 transmits a wireless link release request instructing the release of the wireless link through the provisional subnetwork to the IP telephone terminal 302 after the end of the wireless communication through the provisional subnetwork of the IP telephone terminal 302.

Next, the handover processing by the IP telephone system 100 is described in detail with reference to FIGS. 19 and 20.

Figure 19:
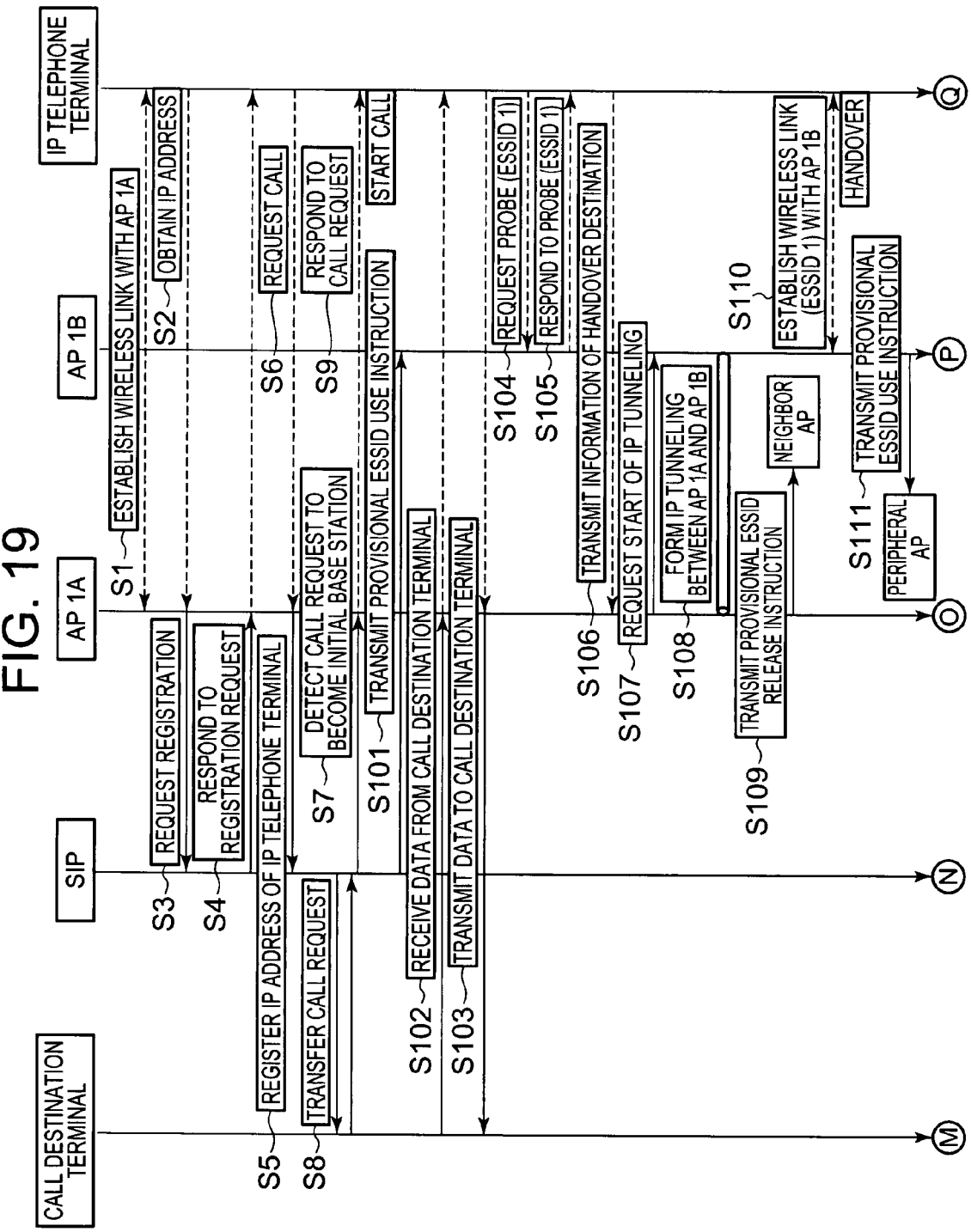
FIG. 19 is a diagram showing an example of the operation of handover processing by the IP telephone system of FIG. 17.
Figure 20:
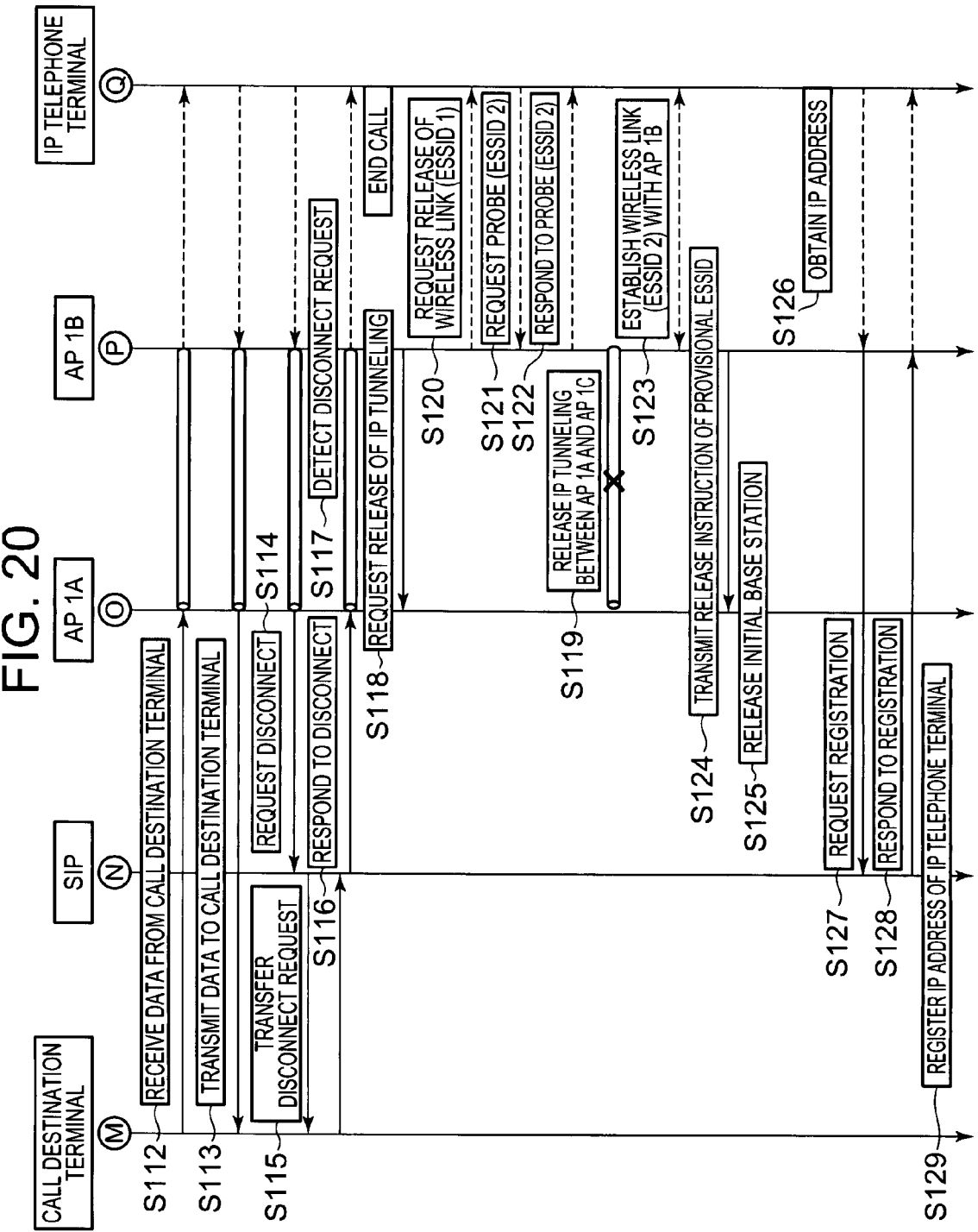
FIG. 20 is a diagram showing the continuation of the handover processing of FIG. 19.
Figure 21:
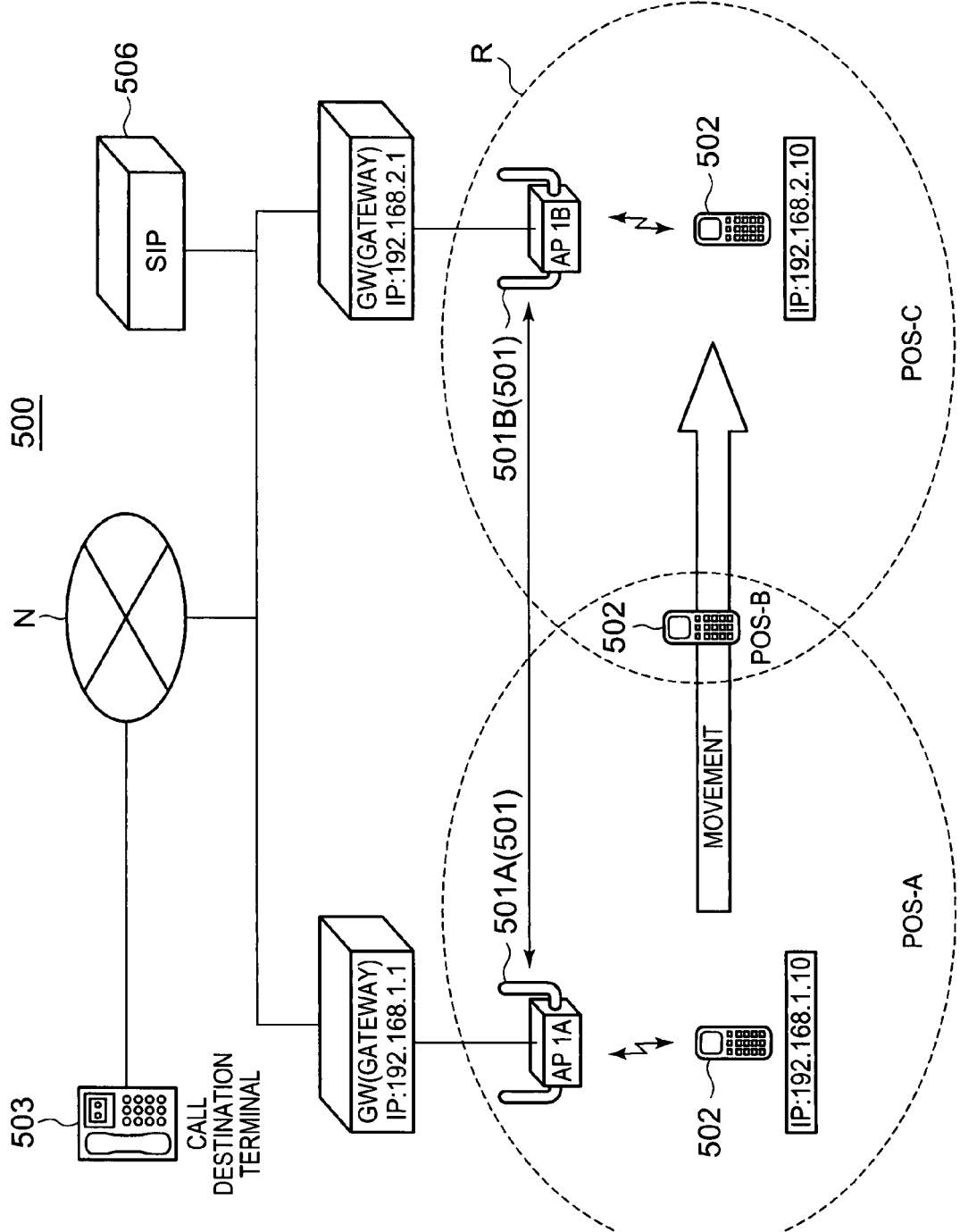
FIG. 21 is a view for illustrating the handover processing by a conventional IP telephone system.

FIGS. 19 and 20 are diagrams showing an example of the operation pertaining to the handover processing by the IP telephone system 100.

As shown in FIG. 19, in the IP telephone system 100 of the second embodiment, a wireless link is established between the first access point 1A and the IP telephone terminal 302 similarly in the IP telephone system 100 of the first embodiment. When a call is started after the obtainment of the IP address "IP: 192.168.1.10" (Steps S1-S9), the access point communication unit 312 of the first access point 1A produces a provisional ESSID use instruction including the same provisional "ESSID 1" as the identifier "ESSID 1" of the self subnetwork and the MAC address information of the IP telephone terminal 302, and the access point communication unit 312 transmits the provisional ESSID use instruction to the neighbor access point 301 (the second access point 1B is denoted by arrows in FIG. 19) (Step S101).

The IP telephone terminal 302 then starts a call (communication) with the call destination terminal 3 connected through the SIP server 6, and the transmission and the reception of data is performed with the call destination terminal 3 through the first access point 1A (Steps S102 and S103).

When the user carrying the IP telephone terminal 302 here moves from the position A to the position B (see FIG. 17), the received power level of the signal from the first access point 1A, which signal is detected by the access point designation unit 22, ends up gradually lowering. When the access point designation unit 22 then judges that the received power level is the predetermined value or less, then the wireless communication processing unit 21 transmits a probe request with regard to the "ESSID" that is the identifier of the present connection relative to all of the frequencies "CH" from the two-way antenna 11a and retrieves the access point 301 of the handover destination (Step S104).

The terminal communication unit 311 of the second access point 1B performs a probe response to the same probe request as the identifier "ESSID 1" of the first subnetwork based on the provisional ESSID use instruction because both of the MAC address and the identifier "ESSID 1" agree with those of the terminal communication unit 311 (Step S105).

When the access point designation unit 22 of the IP telephone terminal 302 receives a probe response from the second access point 1B with the two-way antenna 11a, the access point designation unit 22 designates the second access point 1B as the access point 301 of the handover destination.

The wireless communication processing unit 21 transmits the information of the handover destination prescribing the access point 301 of the handover destination from the two-way antenna 21a to the first access point 1A (Steps S106).

When the first access point 1A receives the information of the handover destination through the terminal communication unit 11, the access point communication unit 312 transmits a start request of IP tunneling to the second access point 1B of the handover destination (Step S107).

When the second access point 1B receives the start request of IP tunneling through the access point communication unit 312, the tunneling processing unit 13 connects the second access point 1B with the first access point 1A by the IP tunneling in the state capable of performing data communication (Step S108).

The access point communication unit 312 of the first access point 1A produces a provisional ESSID release instruction instructing the release of the use of the provisional "ESSID", and transmits the provisional ESSID release instruction to the neighbor access points 301 other than the second access point 1B connected by the IP tunneling (Step S109).

In each of the neighbor access points 301 other than the second access point 1B, the use of the provisional "ESSID" is released by performing predetermined processing based on the received provisional ESSID release instruction, and consequently it becomes impossible for the neighbor access point to respond to the probe request of the identifier agreeing with a provisional ESSID (the identifier "ESSID 1" of the first subnetwork).

The second access point 1B makes association response to the association request of the same identifier "ESSID 1" as the identifier of the provisional ESSID use instruction from the IP telephone terminal 302, and a wireless link is thereby established between the second access point 1B and the IP telephone terminal 302 through the provisional subnetwork of the identifier "ESSID 1" (Step S110).

The access point communication unit 312 produces a provisional ESSID use instruction including the provisional "ESSID 1" and the MAC address information of the IP telephone terminal 302 in preparation for the next handover, and transmits the provisional ESSID use instruction to the neighbor access points 301 other than the first access point 1A (Step S111).

At the time of a call between the IP telephone terminal 302 and the call destination terminal 3, the communication data transmitted from the call destination terminal 3 is then received by the first access point 1A, and a second header portion is added to the communication data in the access point 1A. After that, the communication data passes through the IP tunneling to be transmitted to the second access point 1B, and the second header portion is removed in the access point 1B. After that, the communication data is transmitted to the IP telephone terminal 302 (Step S112; see FIG. 20). On the other hand, the communication data transmitted from the IP telephone terminal 302 is received by the second access point 1B, and a second header portion is added to the communication data in the access point 1B. After that, the communication data passes through the IP tunneling to be transmitted to the first access point 1A, and the second header portion is removed in the access point 1A. After that, the communication data is transmitted to the call destination terminal 3 via the network circuit N (Step S113).

When a user operates the call ending button (not shown) of the operation unit of the IP telephone terminal 302, the wireless communication processing unit 21 transmits a disconnect request signal to the SIP server 6 through the second access point 1B, the IP tunneling and the first access point 1A (Step S114).

When the SIP server 6 transmits the received disconnect request signal to the call destination terminal 3 (Step S115) and receives the disconnect response signal transmitted from the call destination terminal 3 to the disconnect request, the SIP server 6 transmits the disconnect response signal to the IP telephone terminal 2 through the first access point 1A, the IP tunneling and the second access point 1B (Step S116).

The second access point 1B is monitoring the disconnect request signal transmitted from the IP telephone terminal 2, with which the wireless link is formed, here. When the second access point 1B detects the disconnect request signal, the access point communication unit 312 transmits an IP tunneling release request to the first access point 1A after the end of the call between the IP telephone terminal 302 and the call destination terminal 3 (Step S118).

In the first access point 1A, when the first access point 1A receives the IP tunneling release request through the access point communication unit 312, the tunneling processing unit 13 releases the IP tunneling connecting the first access point 1A with the second access point 1B (Step S119).

In the second access point 1B, for example, when the IP tunneling with the first access point 1A is released, the second access point 1B releases the use of the provisional "ESSID."

After the end of the call of the IP telephone terminal 302, the second access point 1B transmits a wireless link release request of the identifier "ESSID 1" to the IP telephone terminal 302 (Step S120).

In the IP telephone terminal 302, when the IP telephone terminal 302 receives the wireless link release request through the wireless communication processing unit 21, the IP telephone terminal 302 releases the wireless link through the subnetwork of the identifier "ESSID 1," and newly builds a wireless link through the normal subnetwork (identifier "ESSID 2") of the second access point 1B.

That is, the wireless communication processing unit 21 transmits a probe request of the identifier "ESSID 2" from the two-way antenna 11a (Step S121). The probe request is received by the terminal communication unit 311 of the second access point 1B, and a probe response is transmitted from the second access point 1B (Step S122). After a not shown association request response, a wireless link is established between the second access point 1B and the IP telephone terminal 302 through the normal subnetwork (identifier "ESSID 2") (Step S123).

The access point communication unit 312 of the second access point 1B produces a provisional ESSID release instruction instructing the release of the use of the provisional "ESSID," and transmits the provisional ESSID release instruction to all of the neighbor access points 301 (Step S124).

In each of the neighbor access points 301, the use of the provisional "ESSID" is released by performing predetermined processing based on the received provisional ESSID release instruction, and consequently it becomes impossible to respond to the probe request of the identifier agreeing with the provisional ESSID.

In the first access point 1A, the function as the initial access point is then released (Step S125).

The wireless communication processing unit 21 of the IP telephone terminal 302 transmits a DHCP request to the DHCP server through the second access point 1B, for example, after the establishment of the wireless link with the second access point 1B through the normal subnetwork (identifier "ESSID 2"), and then obtains the IP address "IP: 192.168.2.10" in the subnetwork to which the access point 1B is connected from the DHCP server (Step S126).

The IP telephone terminal 302 transmits a registration request (for example, the telephone number thereof, the IP address thereof and the like), for example, to the SIP server 6 of the second access point 1B (Step S127).

When the SIP server 6 receives the registration request from the IP telephone terminal 302, the SIP server 6 responds to the registration request (Step S128), and registers the IP address and the telephone number of the IP telephone terminal 302 in association with each other (Step S129).

As described above, according to the IP telephone system 300 of the second embodiment, the identifier "ESSID" of the access point 301 of the handover destination can be made to be the same identifier "ESSID" as that of the initial access point by using the provisional ESSID use instruction. Because the IP telephone system 300 can also connect a initial access point with a handover destination access point by IP tunneling at the time of handover, it becomes unnecessary to perform the re-obtainment of the IP address of the same network address as that of the access point 301 of the handover destination after the handover, and it becomes unnecessary to perform the obtainment processing of a new IP address from the DHCP server, the IP address change request processing to the SIP server 6 and the call destination terminal 3, and the IP address change processing of the IP telephone terminal 2 in the call destination terminal 3. Consequently, time from the ceasing of a call to the reopening thereof can be greatly reduced.

As a result, the IP telephone system 300, which has few sound breaks and negligible sound breaks even when a handover is performed, can be inexpensively realized.

Although the configuration of performing handover once is exemplified in the second embodiment, the configuration of repeatedly performing another handover may be adopted. Even in this case, there can be adopted the configuration of previously transmitting a provisional ESSID use instruction to the neighbor access points 301 in preparation for the next handover, and then, of re-connecting the initial access point with the handover destination access point by new IP tunneling to repeat the handover over any number of times.

The present invention is not limited to the embodiments described above, but various improvements and changes of the designs may be performed without departing from the sprit and the scope of the present invention.

For example, although the IP telephone systems 100 and 300 have been exemplified as the wireless communication system in the embodiments described above, the IP telephone system of the present invention is not limited to those. For example, the present invention may be applied to the system of performing wireless communication for reproducing information without ceasing like the case where a wireless communication terminal obtains images and sound information in streaming to reproduce them. In this case, a communication party is designated by the input of the uniform resource locator (URL) of a web site of a wireless communication terminal or by the click of an icon indicating video contents on a screen of the wireless communication terminal; a initial access point is determined by the access point's detection of a streaming start request from the wireless communication terminal; and the function as the initial access point is released by the detection of a signal indicating the end of the contents from a server.

Moreover, the application of the present invention to server based computing is also useful. In this case, a communication destination server is specified by a URL or an IP address; a initial access point is determined by the login of a wireless communication terminal to the server; and the function as the initial access point is released by logout.

Although an in-house LAN, which is an exclusive communication network, has been exemplified as the network circuit N in the embodiments described above, the present invention is not limited to use the in-house LAN. For example, an open communication network represented by the Internet or the like may be used.

What is claimed is:

1. A wireless communication system comprising:
   a wireless communication terminal for Internet Protocol (IP) telephony, which is configured to communicate with a specific communication party and which includes an IP address obtaining unit that obtains a new IP address from a Dynamic Host Configuration Protocol (DHCP) server;
   a first base station to which the wireless communication terminal wirelessly connects at a time of starting communication with the specific communication party;
   a second base station to which the wireless communication terminal newly connects after starting the communication with the specific communication party; and
   a first transfer unit, which is included in the first base station, to transfer information transmitted from the specific communication party to the second base station,
   a second transfer unit, which is included in the second base station, to transfer information transmitted from the wireless communication terminal to the first base station,
   wherein each of the first base station and the second base station includes a detection unit to detect an IP telephony call request and an IP telephony disconnect request, each of which is transmittable from the wireless communication terminal,
   wherein when a handover from the first base station to the second base station occurs while an IP telephone call is not taking place, the IP address obtaining unit obtains the new IP address immediately,
   wherein when a handover from the first base station to the second base station occurs while an IP telephone call is taking place, the IP address obtaining unit obtains the new IP address after the IP telephone disconnect request is detected, indicating an end of the IP telephone call, and
   wherein when a handover from the first base station to the second base station occurs while an IP telephone call is taking place, the second base station receives information transmitted from the wireless communication terminal and the second transfer unit transfers the information to the first base station until the wireless communication between the wireless communication terminal and the specific communication party is finished.

2. The wireless communication system according to claim 1, wherein the first transfer unit transfers the information by IP tunneling.

3. The wireless communication system according to claim 1, wherein the second transfer unit performs the transferring by IP tunneling.

4. The wireless communication system according to claim 1, wherein the wireless communication terminal obtains a same network address as that of a network to which the second base station is connected, after the wireless communication between the wireless communication terminal and the specific communication party is finished.

5. The wireless communication system according to claim 1, wherein the first base station transmits the information from the specific communication party to a new base station which is a changed wireless connection destination, every time a wireless connection destination of the wireless communication terminal is changed.

6. The wireless communication system according to claim 1,
   wherein the first base station generates a same provisional identification information as an identification information identifying a network to which the first base station connects, and transmits the provisional identification information to a plurality of neighboring base stations,
   the wireless communication terminal transmits a retrieval signal of the identification information to retrieve a destination base station of wireless connection among the plurality of neighboring base stations, and a given one of the plurality of neighboring base stations performs communication with the wireless communication terminal through a provisional network corresponding to the provisional identification information, in response to the retrieval signal transmitted from the wireless communication terminal based on the provisional identification information transmitted from the first base station.

* * * * *

UNITED STATES PATENT AND TRADEMARK OFFICE
CERTIFICATE OF CORRECTION

| | | |
|---|---|---|
| PATENT NO. | : 8,036,157 B2 | Page 1 of 1 |
| APPLICATION NO. | : 11/820455 | |
| DATED | : October 11, 2011 | |
| INVENTOR(S) | : Tosio Hanabusa | |

It is certified that error appears in the above-identified patent and that said Letters Patent is hereby corrected as shown below:

On the Title page:

Under Item (75) Inventors, line 1;

change "Toshio" to --Tosio--.

Signed and Sealed this
Twenty-sixth Day of June, 2012

David J. Kappos
*Director of the United States Patent and Trademark Office*